(12) United States Patent
Shigeta

(10) Patent No.: US 6,995,817 B2
(45) Date of Patent: Feb. 7, 2006

(54) IMAGE DISPLAY DEVICE

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/940,744

(22) Filed: Sep. 15, 2004

(65) Prior Publication Data
US 2005/0030400 A1  Feb. 10, 2005

Related U.S. Application Data

(62) Division of application No. 09/885,011, filed on Jun. 21, 2001, now Pat. No. 6,795,140.

(30) Foreign Application Priority Data

Jun. 26, 2000  (JP) .............................. 2000-191904

(51) Int. Cl.
*G02F 1/1335* (2006.01)
(52) U.S. Cl. .................. 349/106; 349/113; 349/114
(58) Field of Classification Search ................ 349/106, 349/113–114
See application file for complete search history.

(56) References Cited

U.S. PATENT DOCUMENTS

| | | | | |
|---|---|---|---|---|
| 4,800,474 A | | 1/1989 | Bornhorst ................... 362/293 |
| 5,233,385 A | | 8/1993 | Sampsell ...................... 355/35 |
| 5,523,802 A | | 6/1996 | Sugihara et al. ............ 348/743 |
| 5,650,832 A | | 7/1997 | Poradish et al. ............ 348/743 |
| 5,751,429 A | | 5/1998 | Wada et al. ................. 356/419 |
| 5,805,243 A | | 9/1998 | Hatano et al. ................. 349/5 |
| 5,984,478 A | * | 11/1999 | Doany et al. ................ 353/84 |
| 6,011,662 A | | 1/2000 | Evans ........................ 359/891 |
| 6,256,073 B1 | | 7/2001 | Pettitt ......................... 348/743 |
| 6,326,972 B1 | | 12/2001 | Buhler et al. ............... 345/474 |
| 6,392,717 B1 | | 5/2002 | Kunzman .................... 348/744 |
| 6,474,819 B2 | | 11/2002 | Yoder et al. .................. 353/98 |
| 6,554,454 B1 | | 4/2003 | Kitano ........................ 362/293 |
| 6,795,140 B2 | * | 9/2004 | Shigeta ........................ 349/106 |
| 6,870,523 B1 | * | 3/2005 | Ben-David et al. ........... 345/84 |
| 2001/0053016 A1 | | 12/2001 | Nelson ........................ 359/291 |
| 2002/0005829 A1 | * | 1/2002 | Ouchi .......................... 345/88 |
| 2002/0044445 A1 | | 4/2002 | Bohler, et al. .............. 362/293 |

(Continued)

FOREIGN PATENT DOCUMENTS

EP         0 474 202        9/1991

(Continued)

Primary Examiner—Nathan J. Flynn
Assistant Examiner—Ahmed N. Sefer
(74) Attorney, Agent, or Firm—Fitzpatrick, Cella, Harper & Scinto

(57) ABSTRACT

Image qualities of a full color image can be changed as needed by arranging two flat round color filter plates so as to overlap each other in part and so as to be selectively rotationally driven. Further, these color filter plates and are set so that the color characteristics thereof are mutually different from each other. White light from a lamp is injected into an overlapping portion A of these color filter plates, but this white light is converted into light of each single color as the color filter plate is rotationally driven, and this light irradiates an image display element. At the image display element, an image is switched or changed in synchronization with the irradiation of the light in single colors; therefore, the image is recognized as a color image and the colors of a plurality of color images are mixed to be seen and recognized as full color image. The image qualities of this image are switched or changed by means of changing the driven color filter plates.

11 Claims, 15 Drawing Sheets

U.S. PATENT DOCUMENTS

| | | | |
|---|---|---|---|
| 2002/0093477 A1 * | 7/2002 | Wood | 345/89 |
| 2002/0140910 A1 | 10/2002 | Stark, et al. | 353/84 |
| 2003/0142241 A1 * | 7/2003 | Allen et al. | 348/742 |
| 2004/0008288 A1 | 1/2004 | Pate, et al. | 348/742 |

FOREIGN PATENT DOCUMENTS

| | | | |
|---|---|---|---|
| JP | 61-61587 | | 3/1986 |
| JP | 1-315715 | | 12/1989 |
| JP | 5-83722 | | 4/1993 |
| JP | 6-230737 | | 8/1994 |
| JP | 9-61244 | | 3/1997 |
| JP | 10-31168 | * | 2/1998 |
| JP | 2000/98325 | | 4/2000 |
| JP | 2000-98325 | * | 4/2000 |
| JP | 2000-105362 | | 4/2000 |
| JP | 2000-199928 | | 7/2000 |
| JP | 2000-347287 | | 12/2000 |

* cited by examiner

IMAGE DISPLAY DEVICE

This is a divisional application of application Ser. No. 09/885,011, filed on Jun. 21, 2001 now U.S. Pat. No. 6,795,140, which is now allowed.

BACKGROUND OF THE INVENTION

1. Field of the Invention

The present invention relates to a so-called field sequential format image display device.

2. Related Background Art (1) Conventionally, image display devices for displaying all sorts of information are being used in various fields, as is explained below.

In recent years, there have been more and more situations in which large-screen display devices are used for enjoying movie, television images and home video images in the home, and for using various picture image sources, such as for presentations and television conferences, in the office.

Furthermore, in contrast to the case of sequentially scanning multiple display value picture elements inside the screen to display an image as in the case of conventional CRT and liquid crystal, there exists a display device using a binary display picture element and performing time divisional display based on pulse width modulation (PWM) per each indicated value in order to realize a multiple gradation display. Examples of display devices for performing such time division display include plasma display; ferroelectric liquid crystal (FLC); rear-type projection television using binary-displayable spatial modulation elements (image display elements) being represented by MEMS (micro-electro-mechancial systems)-type elements such as those of the DMD devices of Texas Instruments (TI); and projection-type projectors.

Furthermore, it is desirable to realize a display portion of which the construction itself is concise, and thus inexpensive and light, so as to provide a product that may be easily purchased by a consumer.

(2) In recent years, colorization of the display is desired. One method for this is a so-called field sequential method. Hereinafter, explanation is made of this method.

In the case of a projection-type display device such as a projector, one layer of the spatial modulation element is used to display the image in each color sequentially, and synthesis thereof is performed by the vision faculties of the viewer. Thus, for realizing a single display, the single-plate sequential color-switching-format display device not only requires only one third of the cost of the conventional three-plate format for the spatial modulation elements and peripheral circuitry, but also, the optical system and the electrical circuitry system, for example, are simplified. This is one method for realizing an inexpensive and light display portion.

Methods of sequentially switching the color include a format such that a color filter is made out of a high-speed responding liquid crystal and switching is performed therewith, and a format such that a disc-shaped color filter is made to rotate and switching is performed therewith, for example.

(3) Explanation is made of an image display device using this field sequential format, making reference to an example of a conventional construction in FIG. 8.

A conventional image display device 200, as shown in FIG. 8, is equipped with an image display element 2 for modulating incident light and displaying a black-and-white image, and is constructed so that light is irradiated to a display element 2 from an illumination device 203. This illumination device 203 is constructed of a metal halide lamp 30 for irradiating white light; one disc-shaped color filter plate 231 arranged between the lamp 231 and an image display element 2; and a filter rotating unit 233 for rotating the color filter plate 231. Further, by rotating the color filter plate 231 at a fixed speed by means of the filter rotating unit 233, a construction is realized such that light of each color is sequentially radiated to the display element 2. Here, the term "black-and-white image" is used in contrast to "color image", and does not refer to binary gradation. For example, the image display element 2 of the present embodiment is a binary display device, but multiple-gradation display may be realized by performing time division operations.

The illumination device 203 is constructed as described above. Thus, the images displayed to the image display element 2 are sequentially switched in synchronization with the sequential radiation of each color of light. This produces the result that the image is displayed to the screen 4 in each color. The color images in multiple colors are visually mixed, and thus recognized as a full color image.

Note that, the color filter plate 231, as shown in detail in FIG. 9, is divided into the color areas 231R, 231G and 231B, red, green and blue, respectively. Reference numeral 231a indicates the rotational center of the color filter plate 231.

(4) Hereinafter, explanation is made of a detailed construction of the image display device, for reference.

Reference numeral 7 is an image signal input unit. Reference numeral 8 is a signal processing unit for adjusting image qualities of an inputted picture image signal such as brightness, color characteristics and gamma characteristics, performing image signal processing of converting the inputted picture image to a time division signal based on a pulse width modulation suitable for driving the display element, and generating, for example, a pulse for driving the display element and a motor control signal. Reference numeral 8a is a data bus for transmitting the time division signal to the display element, and reference numeral 8b is a control line for transmitting the drive pulse to the display element.

Reference numeral 2 is the ferroelectric liquid crystal (FLC) or the binary display image display element represented by the MEMS (micro-electro-mechanical systems)-type element such as the DVD device from Texas Instruments (TI), and is a reelection-type display element for reflecting light.

Reference numeral 35 is a ballast power source for lighting up the metal halide lamp 30. Reference numeral 5 is an optical system for projection for projecting reflected light from the image display element 2 to a screen 4. Lenses 37 and 38 are arranged between the color filter member 231 and the lamp 30, and between the color filter member 231 and the image display element 2, respectively.

Reference numeral 360 is a detection sensor for detecting the rotational position of the color filter member 231. By means of this detection sensor 360, the rotational phase of the color filter member 360 is communicated to a unit of controlling filter motor within a signal processing unit 8. In order to achieve synchronization of the signal for driving the display element with the rotation phase of the color filter, the unit of controlling filter motor controls the motor control signal by means of a PLL circuit or the like and drives the rotating filter driving portion 233 via a signal line 62.

Next, explanation is made with reference to FIG. 10 of a construction of the above-mentioned signal processing unit 8. Here, FIG. 10 is a block diagram showing a detailed construction of the signal processing unit 8.

The image signal input unit 7 has: an image signal input terminal 71; an input terminal 72 for input of a horizontal synchronization signal for the input signal (IHD); an input terminal 73 for input of a vertical synchronization signal for the input signal (IVD); and an input terminal 74 for input of a clock of the input signal (ICLK).

In the diagram, reference numerals 711, 712, 713 and 714 indicate a data bus for the image signal. Reference numeral 721 indicates a signal line of the horizontal synchronization signal for the input signal (IHD), reference numeral 732 indicates a signal line of the vertical synchronization signal for the input signal (IVD), and reference numeral 741 indicates a signal line of the input signal clock (ICLK).

Reference numeral 80 is an image input unit being a receiving unit for receiving an image signal, such as a decoder for decoding, upon receiving a signal in TMDS format that is an image transmission format adopted in DVI (Digital Visual Interface) standard standardized by a standardization organization DDWG (Digital Display Working Group), the signal into 24-bit data (8 bits per RGB) or a decoder for decoding, upon receiving a compressed signal in MPEG format transmitted via IEEE 1394, the signal into 24-bit data (8 bits per RGB).

Reference numeral 81 is a format converter being a portion for performing the following, for example: resolution conversion comprising appropriate magnification modification and supplementation processing on image signals having resolution levels that do not match the number of display elements of the image display portion; conversion of the image renewal frequency; un-interlacing processing; or color matrix conversion. Further, reference numeral 82 is a memory made of image storage area needed for the image processing by the format converter. Reference numeral 82a is a group of control lines of this memory, and reference numeral 82b is a data line group for communicating data between this memory and the format converter. Reference numeral 83 is a crystal oscillator. Based on a clock (OCLK) formed by the crystal oscillator, and in accordance with controls of a microcomputer unit not shown in the diagram, the format converter 81 forms a horizontal synchronization signal (OHD) and a vertical synchronization signal (OVD) for achieving synchronization after the format conversion. Reference numeral 811 is a signal line for the horizontal synchronization signal (OHD), reference numeral 812 is the signal line for the vertical synchronization signal (OVD), and reference numeral 813 is signal line for the clock (OCLK) formed by the crystal oscillator.

Reference numeral 4 is a unit of adjusting image qualities, for receiving the image signal after format conversion, and adjusting brightness, color characteristics, gamma characteristics, and other image qualities in the display portion according to the microcomputer unit not shown in the diagram.

Reference numeral 85 is a PWN converter for converting a sequentially scanned normal image signal into a time division display signal based on the pulse width modulation. Reference numeral 851 is a storage unit for the time divisional drive sequence describing data order after the PWM modulation, and describing a display period. Reference numeral 854 is a PWM drive timing generator for receiving the time divisional drive sequence and generating a drive timing for the PWM converter and the spatial modulation element, which is the image display unit. Reference numeral 851a is a drive sequence data transmission line from the time divisional drive sequence describing unit to the PWM drive timing generator. Reference numeral 855 is a group of control lines for the drive pulse generated by the PWM drive timing generator, for example. Further, reference numeral 856 is an output terminal for outputting a control signal for the drive pulse, for example, that is transmitted to the image display element 2, and other control signals. Further, reference numeral 857 is a data bus for the image data converted by the PWM converter, and reference numeral 858 is an output terminal for outputting the image data for the image display element 2.

The PWM converter control signal and the display element drive pulse are generated at the PWM drive timing generator (reference numeral 854), in accordance with the sequence data in the time divisional drive sequence describing unit. This produces the result that the image inputted to the signal processing unit is converted to an appropriate format and adjusting of the image qualities is performed; and then, is converted into the time divisional drive signal at the PWM converter 85 and the PWM converter and the display element are synchronized and driven.

Reference numeral 86 is a unit of controlling filter motor for forming a signal for performing motor control of the rotating filter drive unit. Reference numeral 861 is an input terminal for the detection signal from detection sensor for detecting the color filter plate rotational phase, and reference numeral 862 is a signal line thereof. Reference numeral 86 receives the synchronization signal (OVD) of the image signal of the output system from reference numeral 812 and the filter phase from reference numeral 861, and performs control such that synchronization of the two may be achieved inside the unit of controlling motor 86, and a motor control signal for correcting slips in synchronization is outputted from a motor control signal output terminal 864 via the line signal 862.

FIG. 11 is an example showing a display data array after the PWM modulation by the PWN modulator 85. In this figure, the horizontal direction indicates time, and the reference numeral 601 is a start pulse of a screen display in the field in red, green and blue.

The period indicated by reference numeral 602 is a period R; the period indicated by reference numeral 603 is a period G; and a period B follows after this period 603.

Reference numeral 604 is the PWM modulated display data for R. Here, for the sake of simplicity, a 6-bit signal is being shown. Reference numeral 606 is a first bit, 607 is a second bit, 608 is a third bit, 609 is a fourth bit, 610 is a fifth bit, and 611 is a sixth bit. The second bit is twice as long as the first bit, and the third bit is twice as long as the second bit, and so on, such that with each next bit the length of the pulse doubles. The signal is modulated to a pulse width corresponding to these bits and the light is reflected at the spatial modulation elements. Thus the image of each color in each field is displayed according to the integral of the period of each color in one field. Similarly, reference numeral 605 is the PWM modulated display data of R. Reference numeral 612 is a first bit, 613 a second bit, 614 a third bit, 615 a fourth bit, 616 a fifth bit, and 617 a sixth bit.

Here, in the spatial modulation element, the period of reference numeral 618 is a time of non-display between the display periods of B and R. Reference numeral 619 is a display period of R, and reference numeral 620 is a time of non-display between the display periods of R and G. Reference numeral 621 shows a display period of G.

Here, consideration is made of a span of a spot of irradiated light on color filter plates 31, 32, and positional relationship of color boundaries of the color filter. In FIG. 12, reference numeral 701 indicates a spot of irradiated light on the color filter plates 31, 32. Reference numeral 702 indicates a position corresponding to the spatial modulation element irradiating on the spot. This, therefore, shows an outline of the spatial modulation element at the spot. Further, reference numeral 703 is the rotational center of the color filter plate. Reference numerals 704 and 705 indicate positions where the boundaries of the color filters of different colors transverse points represented by reference numerals 706 and 707, respectively. As is clear in FIG. 12, the time at which a color filter boundary transverses the point in the spatial modulation element corresponding to reference numeral 706, and the time at which a color filter boundary transverses the point corresponding to reference numeral 707 are different. Therefore, during a period between these two times, light in two colors is irradiated on the screen of the same spatial modulation element.

Returning again to FIG. 11, reference numeral 622 indicates a color period of the color filter at the reference numeral 706 point in FIG. 12, reference numeral 623 is the period R, and reference numeral 624 is the period G. Further, reference numeral 625 indicates a color period of the color filter at the reference numeral 707 point in FIG. 12, reference numeral 626 is the period R, and reference numeral 627 is the period G.

As may be understood from FIG. 11, during the periods indicated by reference numerals 628 and 629, light in two difference colors is irradiated at the same spatial modulation element screen. In the case of the rotating color filter, color mixing occurs while the spot light is passing through the filter boundary. Further, the same sort of problem occurs in the case when a color filter of liquid crystal is used in a switching fashion. In this case, color mixing occurs during the period of time necessary for the liquid crystal to respond to the switching of color filters for each color. Therefore, placing importance on color purity, there are cases when this period is treated as a non-display period and is not used. Further, even though color mixing occurs as shown in the figure, there are cases when this period is used as a display period, just as it is in order to obtain increased brightness. In either case, at the boundary portion of the different color filters there is an unusable portion having at least the range indicated by 620.

However, in display devices having such a sequential, color-switching format, the construction and characteristics of the color filter plate are a significant factor in determining the performance of the display device. For example, the brightness and color characteristics of an image are such that when efforts are made to improve the one, the other suffers. Thus, there is a trade-off relationship between the two (i.e., a relationship such that in order to improve the performance of one it is necessary to sacrifice the performance of the other. Hereinafter, this term is used for the same meaning). Hereinafter, explanation is made of this point.

That is, the construction and the characteristics for the color filter are selected from a host of aspects that are in a trade off relationship, such as brightness, color characteristics and performance speed. Therefore, in conventional image display devices it was difficult to optimize for diverse image sources so as to further improve image qualities.

For example, with respect to the relative portion of the circle occupied by a color and the transmittancy characteristics of that color, there is a trade off relationship that obtains between the brightness and the color characteristics. Further, with respect to the number of divided filters, there is a trade off relationship obtaining between improving the image qualities by accelerating the switching of the illumination light colors, and brightness and color characteristics.

With respect to the portion of the circle that each color occupies, an example may be given for performing processing for emphasizing white brightness. In addition to the RGB color segments, a white (W) area may be set, through which all wavelength components transmit. In white-brightness-emphasization processing, which is for emphasizing an apparent brightness, the peak brightness of white increases, but the filter surface area of each of the RGB color components decreases. Thus, the range is diminished during which the brightness of each pure color is reproduced, and the level of color purity declines.

An explanation is now made of the white-brightness-emphasization processing. In the color field sequential display format for sequentially displaying the signals RGB of each of the colors, the signals of G and B are discarded when R is displayed; R and B are discarded when G is displayed; and G and R are discarded when B is displayed. Therefore, the light usage ratio is basically at the level of ⅓, so there is insufficient brightness. In order to augment this, there is a method known in U.S. Pat. No. 5,233,385, for example, for artificially emphasizing white brightness in a white signal exceeding a predetermined signal level, by using a white-brightness-emphasization signal to display in a white display area. FIG. 13 is an example of a construction of a color filter of a display device having a function for such white-brightness-emphasization. 31R is a color filter (color area) designed to transmit red color components, 31G is the same for green color components, and 31B is the same for blue color components. Here, 31W is an area used for emphasized display of white. Reference numeral 31a is rotational center portion attached to a rotation axis.

FIG. 14 is an explanatory diagram of display brightness levels displayed by a display device. The vertical axis indicates the display brightness of the display device.

The solid lines 901 and 904 indicate display brightness levels corresponding to signal levels changing, in steps, from 0% to 100%. Further, the broken line 906 indicates brightness levels from 100 to 200%, realized by means of the white-brightness-emphasization processing. 902 and 903 are points on 901; 907 and 909 are points on 904; and 908 and 910 are points on 906. Further, the bold broken line 905 is the display brightness of a white display portion produced by the white-brightness-emphasization signal. In the normal situation, in which white-brightness-emphasization processing is not performed, display is possible to the level of 100% indicated by 901. Normally, signals corresponding to this signal are provided for each of the colors RGB, and are displayed with a brightness in the range of 0 to 100%. Therefore, a brightness range from 902 to 903 becomes the display range of the display device. In the case when white-brightness-emphasization processing is performed, the display device extracts the white signal common to R, G and B from signals exceeding a predetermined signal level, and performs a display corresponding to the white-brightness-emphasization signal 905 in the white area. Further, the differential signals remaining after the white signal is extracted from each of the color signals are displayed in the display areas of each of the colors. 904 corresponds to the display by this differential signal. As a result, the display brightness level that is finally realized is a brightness level 906 being a composite of 904 and 905. As a result, display brightness levels 907 and 909 are converted to 908 and 910 respectively and displayed.

As described above, white-brightness-emphasization processing is an effective method for emphasizing the display peak of white. However, the display range of each of the single colors R, G and B is only 0 to 100%, while white alone is 0 to 200%. Thus, the color purity of the display device diminishes. The issue of whether to perform the white-brightness-emphasized display or not, and the issue of the proportions at which each of the color areas, including white, should be set, involve a trade off relationship between brightness and color purity. If one of these is improved, it is necessary to sacrifice characteristics of the other.

For the transmittancy characteristics of each color, it is possible to set a slightly wide range for the transmission wavelengths of the filter for each color to produce increased brightness. However, it has been pointed out that this produces deteriorated color characteristics. In FIG. 15, an example is shown of transmittancy characteristics of filters of each color R, G and B. The horizontal axis is the light wavelength in terms of nm. The vertical axis is the light transmittance in terms of percentage. 1001 is the transmittancy characteristic of R; 1002 is the transmittancy characteristic of G; and 1003 is the transmittancy characteristic of B. According to the example of FIG. 15, the transmittancy wavelength area of R and the transmittancy wavelength range of G are overlapping. Therefore, it may be said that color purity is suffering, but the brightness is increasing. When the overlap of the wavelength range is decreased, brightness decreases while the color purity is improved. In this way, brightness and color purity stand in a trade off relationship such that if one is improved then the characteristics of the other must be sacrificed.

In connection with the issue of the number of filter divisions, an example may be given of an approach for solving the color-split phenomenon. With the sequential, color-switching format, there is known the following unique problem: each of the images R, G and B should be composited against a quickly moving line of vision all at the same position visually. However, the positions of images R, G and B appear to slip from that position, and a phenomenon of color splitting occurs (color breakdown phenomenon). In order to suppress this phenomenon, there exists a method of increasing the number of divisions and rotations in each filter (i.e., in each color area) in the color filter plate, and increasing the renewal wavelength of the screen. However, increasing the number of divisions of the filter increases the unusable boundary region of the filter as explained in FIG. 11, which leads to reduced brightness. Further, when the usable range of the boundary portion is increased for the sake of better brightness, the level of color purity drops. In this way, acceleration for purposes of resolving the color split phenomenon (or color breakdown phenomenon) stands in a trade off relationship with both brightness and color purity. If one of these is improved, the characteristics of the other suffer.

Note that, Japanese Patent Application Laid-open No. 5-83722 and Japanese Patent Application Laid-open No. 2000-347287 disclose other background technologies.

SUMMARY OF THE INVENTION

An object of the present invention is to provide an image display device capable of switching image qualities as necessary.

In order do accomplish this, there is provided an image display device comprising: an image display element for modulating incident light and displaying an image; and an illumination device for sequentially irradiating with light in each coloer the image display element, which is adapted to change an image displayed on the image display element in synchronization with the irradiation with light to thereby recognize the image as a full color image, characterized in that the illumination device comprises a light source for irradiating white light; a plurality of color filter members being rotatably arranged between the light source and the image display element and having mutually different characteristics; and a filter drive means for rotationally driving each of the plurality of color filter members individually, and that the illumination device further sequentially converts the white light irradiated from said light source into each color of light by rotationally driving the color filter members and switches image quality of the full color image by switching the rotationally driven color filter members.

DETAILED DESCRIPTION OF THE PREFERRED EMBODIMENTS

Hereinafter, explanation is made of a mode of embodying the present invention, making reference to FIG. 1 and FIG. 2.

First, explanation is made of a construction of an image display device in accordance with this mode of embodying the present invention.

Figure 1:
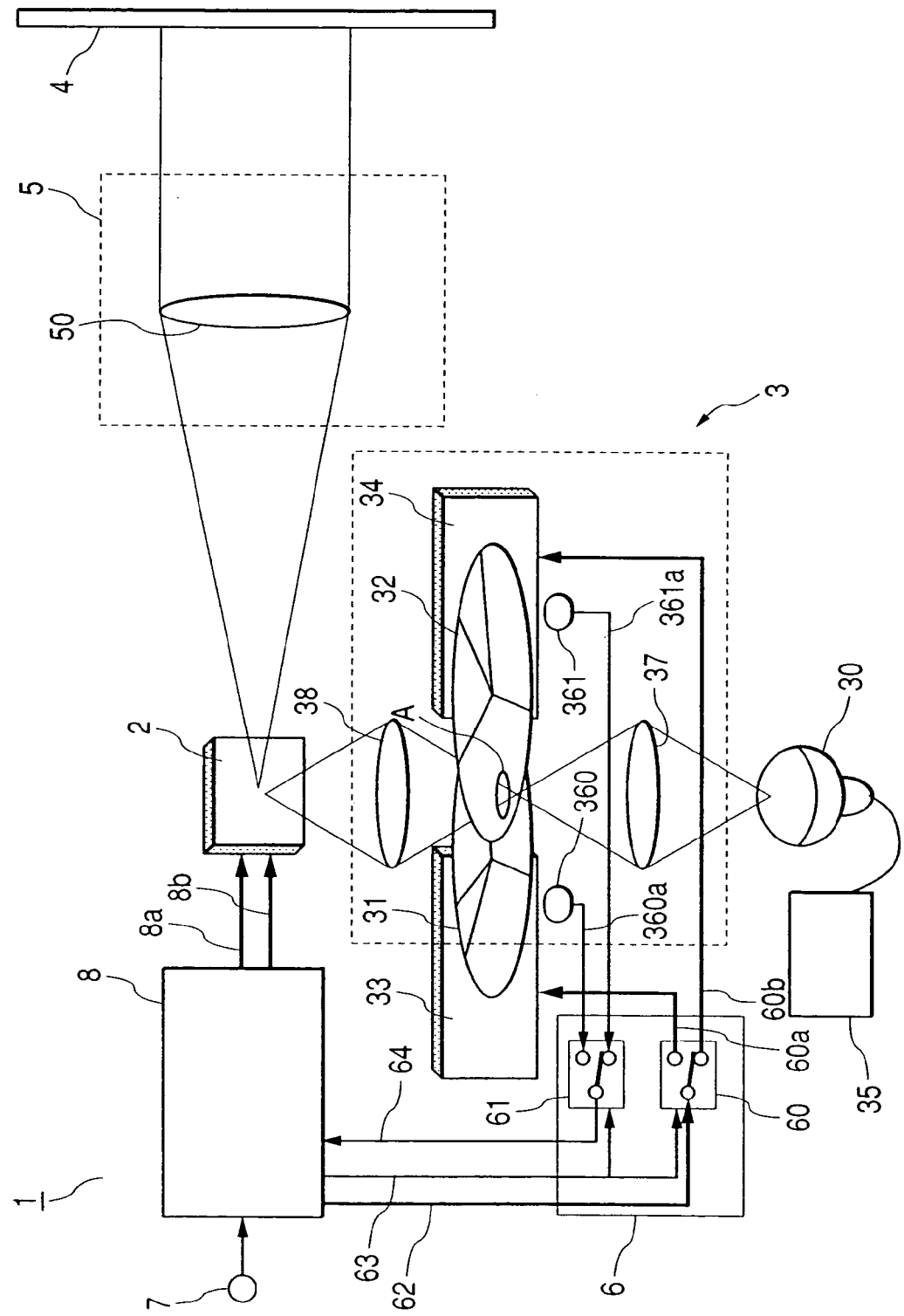
FIG. 1 is a diagram showing one example of a construction of an image display device in accordance with the present invention.

An image display device 1 in accordance with the present invention, for example as shown in FIG. 1, is provided with an image display element 2 for modulating incident light and displaying an image; and an illumination device 3 for sequentially irradiating each color of light onto the image display element 2. Further, the image display device is configured so that the color of the light irradiated by the illumination device 3 is sequentially changed, and an image (black and white image) displayed on to the image display element 2 is changed in synchronization with the irradiation of the light, producing the result that the image is recognized as a color image, and the color images in a plurality of colors are visually mixed, with the result of being recognized as a full color image.

Incidentally, the above-mentioned illumination device 3 has a light source 30 for irradiating white light; a plurality of color filter members 31, 32 being rotatably disposed between the light source 30 and the image display element 2 and having different characteristics (such as brightness, color characteristics) from each other; and a filter drive means 33, 34 for rotationally driving these plural color filter members 31, 32 individually. The illumination device 3 is configured such that, by rotationally driving the color filter members 31, 32, the white light irradiated from the light source 30 is sequentially converted to each color. The image display device 1 as described above is configured such that, by appropriately switching the rotationally driven color filter members 31, 32, image qualities of the full color image are switched.

Figure 2:
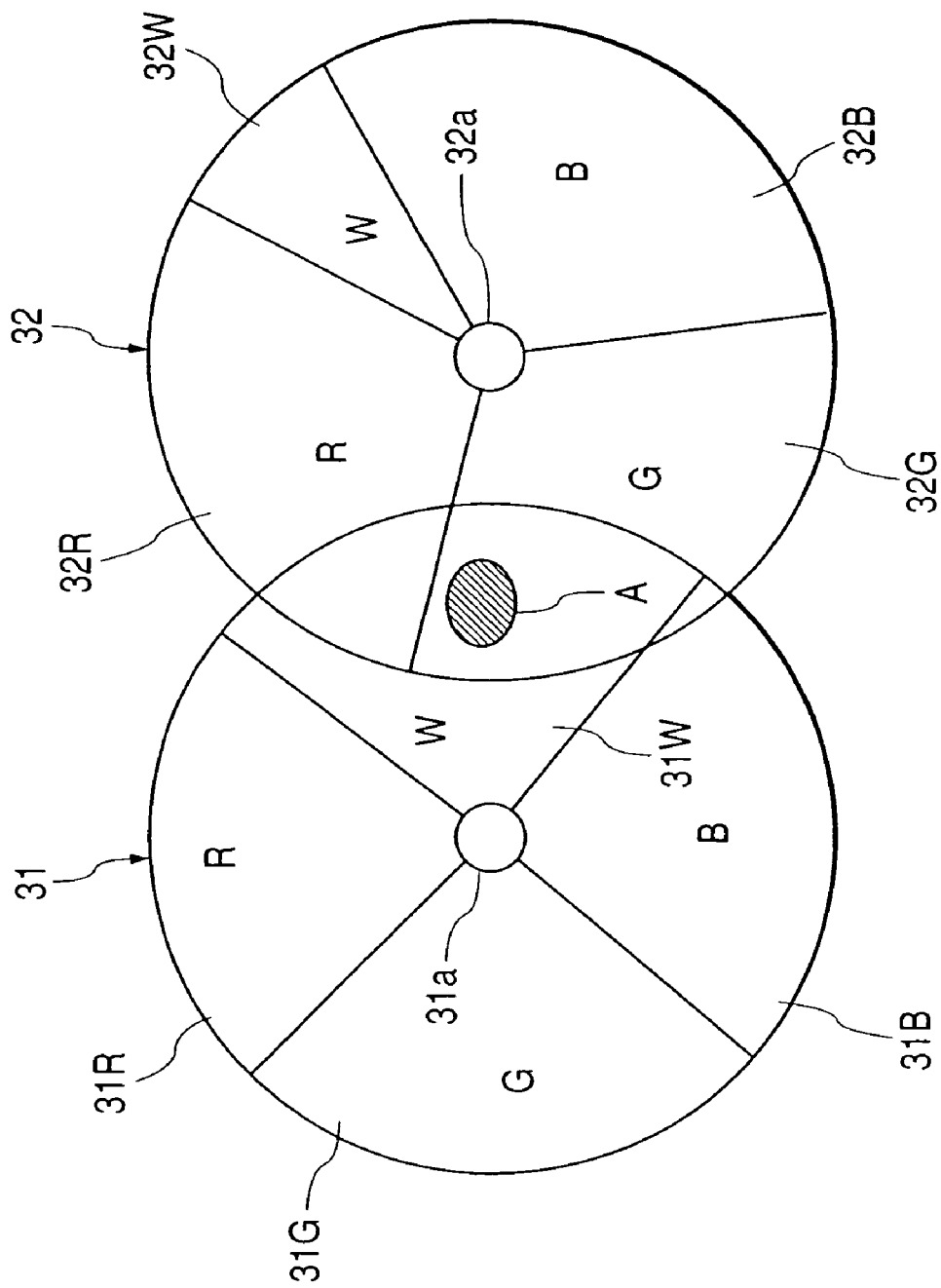
FIG. 2 is a diagram showing a configuration or the like of a color filter plate.

Here, each color filter member 31 and 32, as shown in detail in FIG. 2, has a plurality of color areas 31R, 31G, 31B, 31W, and 32R, 32G, 32B, 32W, respectively.

Now, as described above, these plural color filter members 31, 32 have their characteristics (such as brightness, color characteristics) set as to be different from each other. However, this difference between their characteristics may be achieved by making:

the relative portion of the circle occupied by each of the plurality of color areas 31R, 31G, 31B and 31W on one color filter member 31 be different from the relative portions occupied by each of the plurality of color areas 32R, 32G, 32B and 32W on the other color filter member 32; or the transmittancy characteristics of one color filter be different from the transmittancy characteristics of the other color filter; or the number of color areas 31R, 31G, 31B and 31W of one color filter member be different from the number of color areas 32R, 32G, 32B and 32W of the other color filter member.

It is preferable that the above-mentioned plurality of color filter members 31, 32 are arranged so that they overlap at least at one part.

It is also possible to make at least one color filter member from the color filter members 31, 32 has a white area (see reference numeral 31W, 32W).

Note that, the image display element 2 described above may be of a transmission type for displaying the image by means of letting the light from the illumination device 3 transmit therethrough. However, the image display element 2 may also be of a reflective type for displaying the image by means of reflecting the light from the illumination device 3. Further, the image display device 1 according to the present invention may be of a type for directly seeing and recognizing the image display element 2, or may also be of a projection type for projecting the light irradiated onto the image display element 2 onto a screen, for example, and then seeing and recognizing the image having been displayed on this screen.

Additionally, the image display element 2 mentioned above may be, for example, a liquid crystal element using ferroelectric liquid crystal or some other liquid crystal, a MEMS-type spatial modulation element, or a spatial modulation element with an array of micro-mirrors.

Next, explanation is made of a driving method of the image display device 1 according to the present invention.

In order to display the image by means of the image display device 1, the light source 30 is turned on and made to irradiate white light and the filter drive means is activated, then at least one of the color filter members 31, 32 is rotationally driven. As a result, light of different colors is sequentially irradiated onto the image display element 2. Meanwhile, an image (black and white image) is displayed on the image display element 2 in synchronization with the irradiation of the light. Therefore, the image displayed onto the image display element 2 is recognized not as a black and white image, but as a color image, and the images in each color are visually mixed and recognized as a full color image.

Incidentally, the filter drive means 33, 34 may either:

rotationally drive one of the color filter members 31 or 32 while stopping the other color filter member 32 or 31; or rotationally drive the plurality of color filter members 31, 32 simultaneously and in synchronization. Here, in the case when the plurality of color filter members 31, 32 are arranged so as to overlap in part, and one of the color filter members 31 or 32 is rotationally driven while the other color filter member 32 or 31 is stopped, the stopped color filter member 31 or 32 has a white area 31W or 32W, and it is preferable to have the light transmit through these white areas 31W and 32W.

The issue of which color filter member 31, 32 to drive should be determined by what sort of image qualities are desired in the full color image. However, that determination (i.e., switching of the color filter members 31, 32) may be done: according to changes in an input strain; or according to changes in content of an input signal; or according to changes in attributes of an input signal such as characteristics of a motion picture; or according to the use or purpose of an input image; or according to controls from a user input means; or according to controls from external communications; or automatically.

Note, however, it is preferable that the color filter members 31, 32 be rotationally driven by the filter drive means 33, 34 continuously at a fixed angular velocity.

Next, explanation is made of effects of the present mode.

Figure 8:
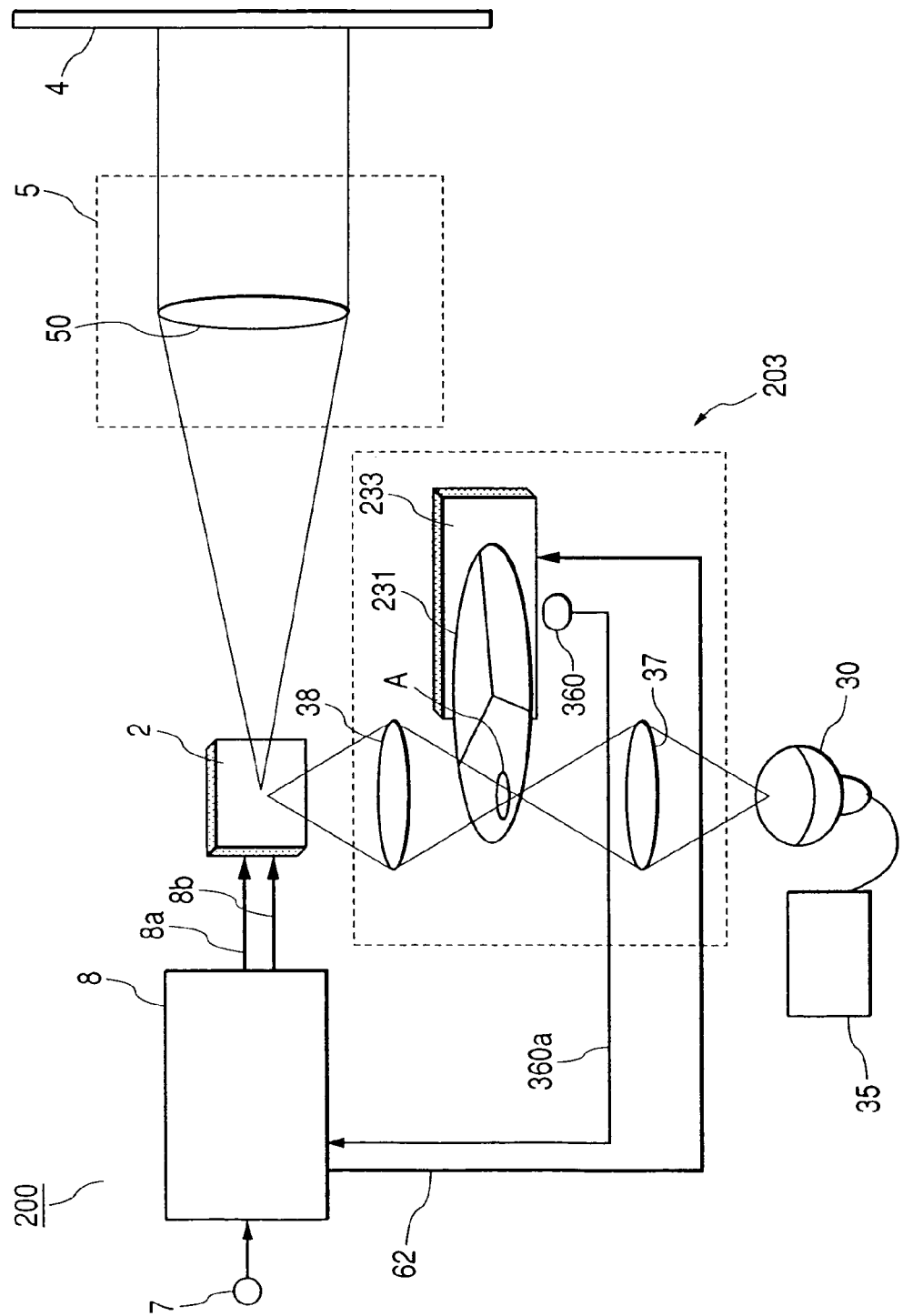
FIG. 8 is a diagram showing one example of a conventional construction of an image display device using a field sequential format.
Figure 9:
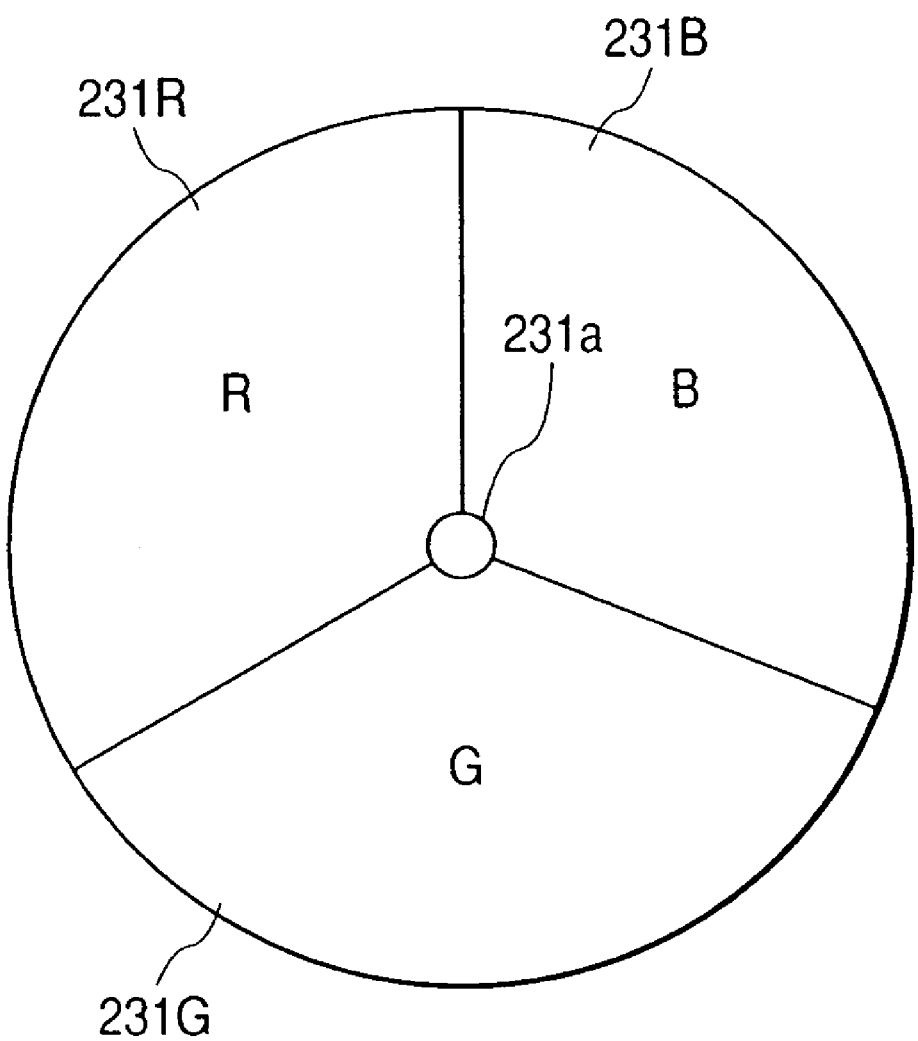
FIG. 9 is a diagram for schematically showing the configuration and the like of the color filter plate.
Figure 10:
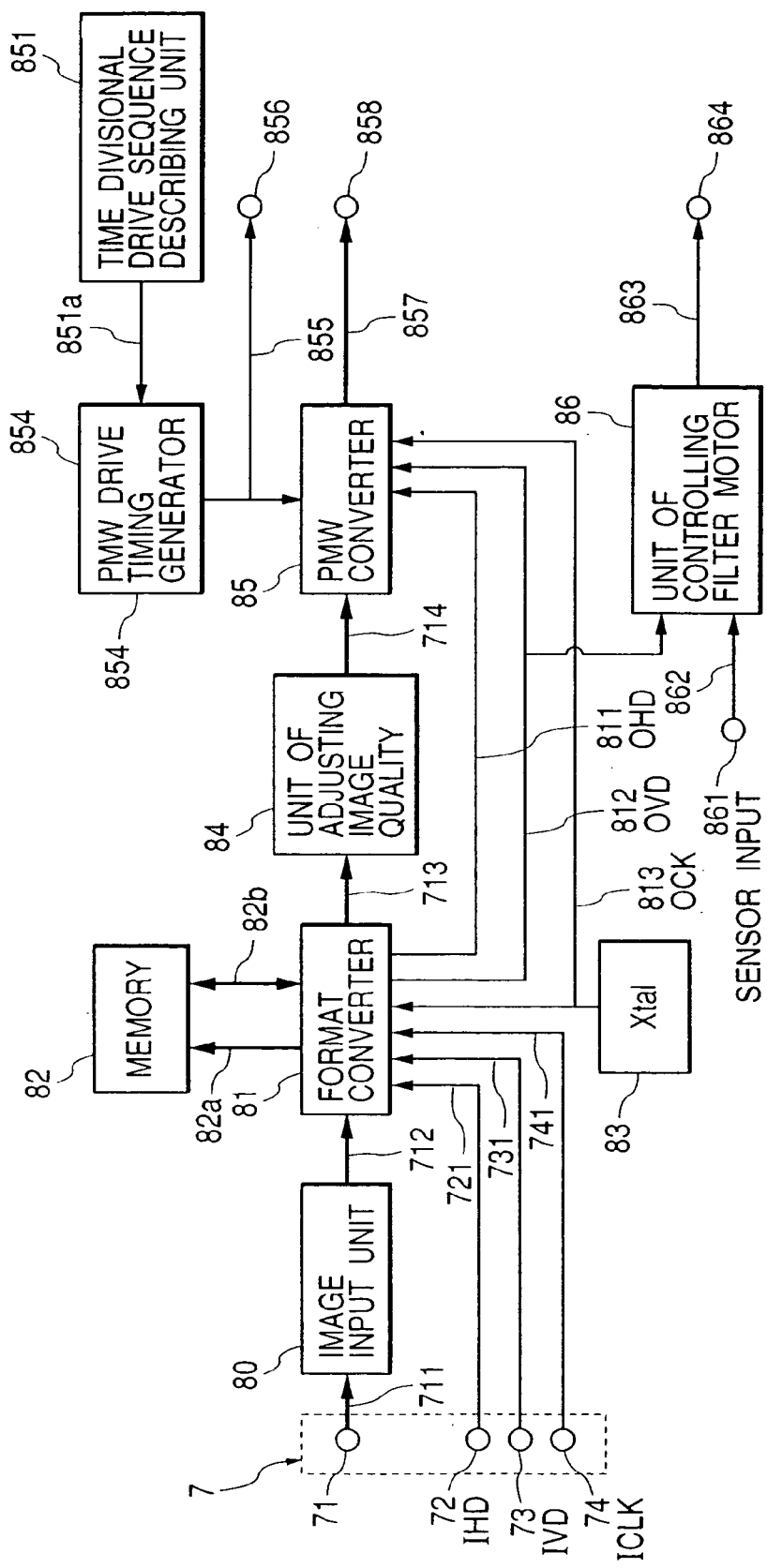
FIG. 10 is a block diagram showing a detailed construction of a signal processing unit of the conventional image display device.

In the conventional imaged display device such as the one shown in FIG. 8, there was only one color filter member (see reference numeral 231). Therefore, a single set of image qualities was determined by the characteristics of the color filter member.

In contrast, according to the present mode of embodiment, both of the plurality color filter members 31, 32 sequentially convert the white light irradiated from the light source 30 into each color, and the characteristics of the two color filter members 31, 32 are set so as to be different from each other. Therefore, it is possible to switch the rotationally driven color filter members 31, 32 appropriately in accordance with display mode or display purpose, use or attributes of the input signal, for example, in order to switch the image qualities of the full color image. That is, brightness, color characteristics and number of filter divisions, for example, were conventionally in a trade off relationship with each other, and the construction and display characteristics of the color filters ware fixed. However, a plurality of differing constructions and display characteristics are provided and it is possible to switch among these in the present mode (i.e., special improvements do not need to be made to the operation speed or other aspects of the electrical performance of the system, the large-scale mechanical structure, or the focusing efficiency or other aspects of the performance of the optical system, for example). Therefore, it becomes possible to change the display characteristics in accordance to the priorities of the image in order to perform an optimal display, and a high performance display becomes possible for realizing displays that are flexibly optimized with respect to diversified input images.

Hereinafter, more detailed explanation is made of the present invention referring to embodiments thereof.

Embodiment 1

First, explanation is made with reference to FIG. 1 of a first embodiment of the present invention.

In the present embodiment, a projection-type image display device 1 such as the one shown in FIG. 1 has been used. First, explanation is made of the overall construction of this image display device 1.

The image display element 2 used in the present embodiment is of a reflection type (i.e., a type for displaying an image by reflecting light from illumination device 3), and a binary display spatial modulation element has been used. Further, in front of the image display element 2 (i.e., in the direction the reflected light from the element 2 is irradiated) there are arranged an image-projection screen 4 and an projection optical system 5 for projecting the reflected light (i.e., light having display information that has been spatially modulated by the image display element 2) onto the screen 4. Further, reference numeral 50 indicates a lens.

Meanwhile, a metal halide lamp (light source) 30 for irradiating white light has been used in the illumination device 3, and this lamp 30 is lit by a ballast electrical source 35. Further, the color filter members 31, 32 are two flat, round members (hereinafter referred to as "color filter plate(s)"). These color filter plates overlap in part, and are positioned so that the light from the lamp 30 is injected into this overlapping portion A at a right angle.

Now, as shown in detail in FIG. 2, both of the color filter plates 31, 32 are divided into four color areas of red, green, blue and white: 31R, 31G, 31B, 31W, and 32R, 32G, 32B and 32W, respectively (reference numerals 31R, 32R refer to a red color area; reference numerals 31G, 32G refer to a green color area; reference numerals 31B, 32B refer to a blue color area; and reference numerals 31W, 32W refer to a white color area). However, the relative portions occupied by each of the color areas 31R, 31G, 31B and 31W on one color filter plate 31 are made to be different from the respective relative portions of the color areas 32R, 32G, 32B and 32W on the other color filter plate 32. Therefore, the characteristics of the color plates 31, 32 are different from each other.

Specifically, that is, on one color filter plate 31, the relative portion of the circle occupied by the white area 31W is set at ¼ of the circle (i.e., set at about 90 degrees) so that the color distribution is one such that emphasis is placed on greater brightness during the white, rather than on the color characteristics. This configuration is designed for PC-type input, for example; therefore, this configuration is suitable for imaging in a binary fashion such as in word processing or in presentations, rather than mild tones or half tones. In contrast, the other color filter plate 32 is set so that the relative portion of the white area 32W is diminished, so that the brightness of each of the individual colors RGB becomes greater than the brightness during the white, with the result of increasing color purity. This configuration is designed for television-type input, for example, performing optimization for picture image sources that place particular importance on the gradation of half tones and color characteristics such as movies. Further, the degree to which the white brightness is emphasized may be adjusted not only by the relative portion of the white areas 31W, 32W provided to each of the color filter plates 31, 32. When only one of the color filter plates (e.g. the color filter plate of reference numeral 32) is being rotationally driven, the light from the lamp 30 is made to transmit through the white area 31 of the color filter plate that is stopped, so that the stopped color filter plate does not to function as a color filter. Note, reference numerals 31*a* and 32*a* indicate the rotational centers of the color filter plates 31 and 32, respectively.

Reference numeral 33, 34 is a filter drive portion (filter drive means) for individually rotationally driving each of the color filter members 31, 32, and is constructed of a motor, gears, etc. Reference numerals 360 and 361 are a detection sensor for detecting rotation phases of each of the color filter members 31, 32.

Reference numeral 6 is a signal switching unit for switching a signal for controlling a motor and a signal for detecting the positions of the color filter plates 31, 32 in accordance with a selection signal indicating whether to drive the first color filter plate 31 or to drive the second color filter plate 32. Reference numeral 60 is a switch for switching the signal for controlling the motor; reference numeral 61 is a switch for switching the detection signal detecting the positions of the color filter plates 31, 32; reference numeral 62 is a signal line for the motor controlling signal before the selection; and reference numeral 63 is a selection signal line for the selection signals of the switching switches 60, 61. Reference numeral 64 is a position detection signal line for a signal detecting the position of the color filter plates 31, 32 after the selection.

Lenses 37, 38 are arranged between the color filter members 31, 32 and the lamp 30, and between the color filter members 31, 32 and the image display element 2 respectively.

Meanwhile, reference numeral 7 in the figure is an image signal input unit, and reference numeral 8 is a signal processing unit for adjusting image qualities of an inputted image signal such as brightness, color characteristics and gamma characteristics; performing image signal processing for performing conversion into a time division signal with a pulse width modulation that is appropriate for driving the display element; and generating a pulse for driving the display element and the signal for controlling the motor, etc. Reference numeral 8*a* is a data bus for transmitting the time division signal to the display element, and reference numeral 8*b* is a control line for transmitting the drive pulse to the display element.

Figure 3:
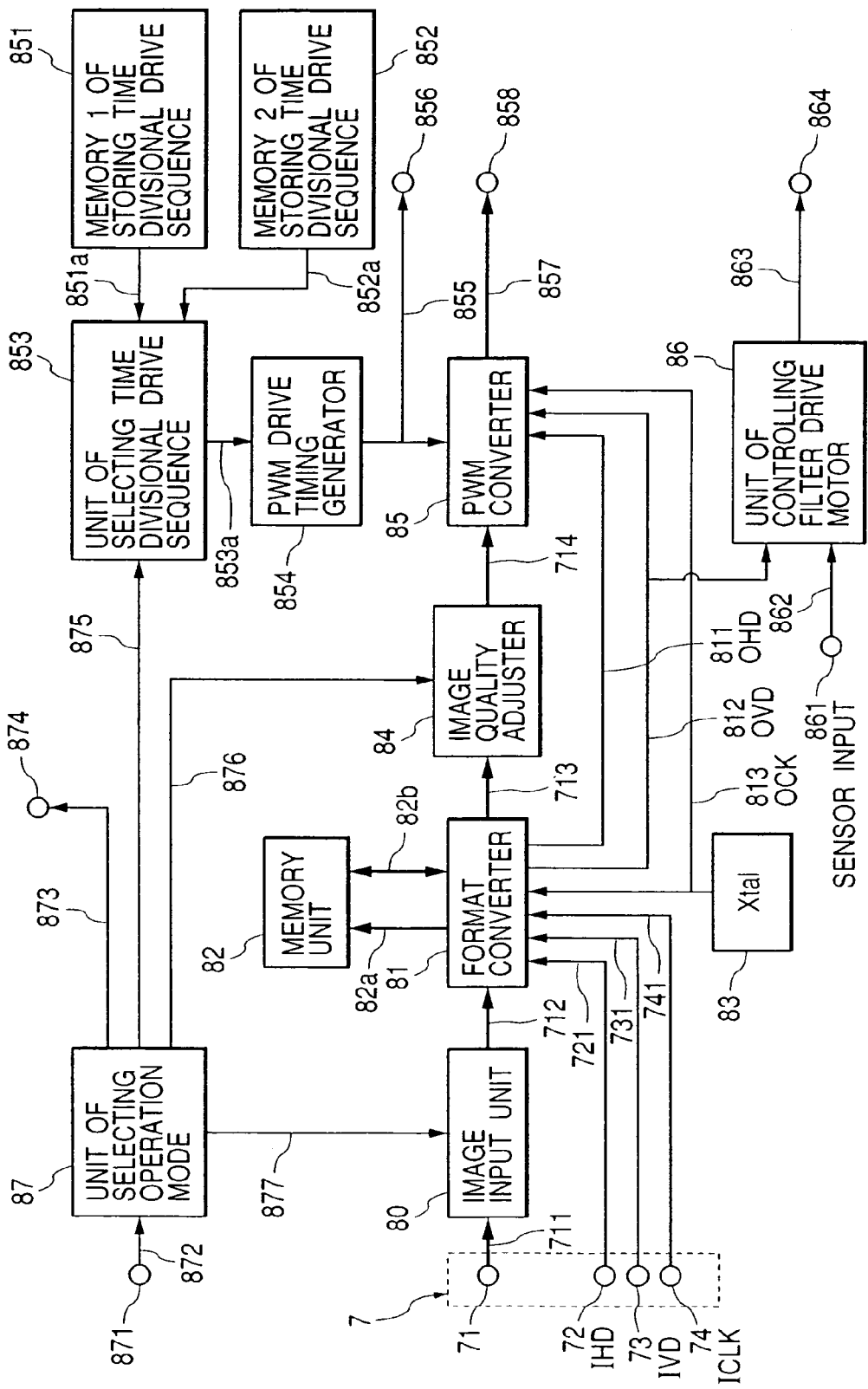
FIG. 3 is a block diagram showing a detailed construction of a signal processing unit.

Next, explanation will be made with reference to FIG. 3 of a construction of the signal processing unit 8 described above. Here, FIG. 3 is a block diagram showing a detailed construction and the like of the signal processing unit 8.

The image signal input unit 7 has an image signal input terminal 71; an input terminal 72 for input of a horizontal synchronization signal for the input signal (IHD); an input terminal 73 for input of a vertical synchronization signal for the input signal (IVD); and an input terminal 74 for input of a clock of the input signal (ICLK).

In the figure, reference numerals 711, 712, 713 and 714 indicate the image signal data bus; reference numeral 721 indicates a signal line for the horizontal synchronization signal of the input signal (IHD); reference numeral 731 indicates a signal line for the vertical synchronization signal of the input signal (IVD); and reference numeral 741 indicates a signal line for the input signal clock (ICLK).

Reference numeral 80 is an image input unit being a receiving unit for receiving an image signal, such as a decoder for decoding, upon receiving a signal in TMDS format that is an image transmission format adopted in DVI (Digital Visual Interface) standard standardized by a standardization organization DDWG (Digital Display Working Group), the signal into 24-bit data (8 bits per RGB) or a decoder for decoding, upon receiving a compressed signal in MPEG format transmitted via IEEE 1394, the signal into 24-bit data (8 bits per RGB).

Reference numeral 81 is a format converter, being a portion for performing, for example, resolution conversion comprising appropriate magnification modification and augmentation and conversion of the image renewal frequency on an image signal having a resolution level that does not match the number of display picture elements in the image display portion; un-interlacing processing; and color matrix conversion. Further, reference numeral 82 is a memory unit, being an image storage area that is necessary for the image processing by the format converter. Reference numeral 82a is a group of control lines for the memory unit, and reference numeral 82b is a group of lines for exchanging data between the memory unit and the converter. Reference numeral 83 is a crystal oscillator. The format converter 81 forms, in accordance with controls from a microcomputer unit not shown and based on a clock (OCLK) made by the crystal oscillator, the horizontal synchronization signal (OHD) and the vertical synchronization signal (OVD) for achieving synchronization after the format conversion. Reference numeral 811 is a signal line for the horizontal synchronization signal (OHD); reference numeral 812 is a signal line for the vertical synchronization signal (OVD); and reference numeral 813 is a signal line for the clock (OCLK) made by the crystal oscillator.

Reference numeral 84 is an image quality adjuster for receiving the image signal after format conversion, and adjusting the brightness, color characteristics and gamma characteristics at the display portion in accordance with controls from the microcomputer unit not shown.

Reference numeral 85 is a PWM converter for converting a sequentially scanned, normal image signal into a time division display signal based on pulse width modulation (PWM). Reference numerals 851, 852 are a memory 1 and a memory 2 for storing two kinds of time divisional drive sequences, recording a data sequence after the PWM modulation and recording a display period. Reference numerals 851a, 852a are drive sequence data transmission lines from each of the memories of storing time decisional drive sequence to a unit of selecting time divisional drive sequence.

Reference numeral 853 is a unit of selecting time division sequence for selecting one sequence from a plurality of time divisional drive sequences, in accordance with a selection of an operation mode. Reference numeral 853 is a data line for transmitting the selected time divisional drive sequence.

Reference numeral 854 is a PWM drive timing generator for receiving this time divisional drive sequence data, and generating a drive timing for the PWM converter 85 and the spatial modulation element, which is the image display portion. Reference numeral 855 is a group of control lines for the drive pulse generated by the PWM drive timing generator, for example. Further, reference numeral 856 is an output terminal for outputting a control signal for the drive pulse, for example, that is transmitted to the spatial modulation element. Further, reference numeral 857 is a data bus for the image data having been converted by the PWM converter. Reference numeral 858 is an output terminal for outputting the image data for the spatial modulation element. The sequence data in the memory for storing the selected time divisional drive sequence becomes the basis for outputting the control signal for the PWM drive timing generator 85, and the drive pulse for the display element.

Reference numeral 86 is a unit of controlling filter drive motor for forming a signal for performing motor control of a rotating filter drive unit. Reference numeral 861 is an input terminal for inputting a detection signal from the detection sensor for detecting the color filter rotational phase. Reference numeral 862 is a signal line for this input terminal. The image signal synchronization signal (OVD) for an output stream is received from reference numeral 812, the color filter phase is received from reference numeral 861, and control for achieving synchronization of the image signal synchronization signal (OVD) and the color filter phase is performed within the unit of controlling filter drive motor 86. Further, a motor control signal for correcting synchronization slips is outputted from a motor control signal output terminal 864 via a signal line 862. This motor control signal output terminal 864 is connected to a signal line 62.

Reference numeral 871 is an input unit for operation signals from a user input means such as a GUI (graphical user interface) using a switch, mouse, keyboard, remote controller or on-screen display (not shown). Reference numeral 872 is a signal line for this input unit. Reference numeral 87 is a unit of selecting operating mode for receiving, as one of the operation signals, a selection operation that selects an operating mode, and providing instructions for each of signal processing units to switch operations based on the selection operation received. Thus, this unit of selecting operating mode 87 jointly performs control of a plurality of color filters. Reference numeral 873 is a signal line for the selection signal for the color filter plates 31, 32, and reference numeral 874 is an output terminal for the signal line 873. This output terminal 874 is connected to a signal line 63.

Reference numeral 87 includes functions in the microcomputer unit, for example, that is not shown in the figure. Reference numerals 877, 875 and 876 are signal lines running from the unit of selecting operating mode to each unit for the selection signals. Reference numeral 877 provides instructions, in accordance with the operation mode selection, for switching the input stream of the image input unit 80 and the transmission format, and changing the signal amplitude and DC level of the input unit. Further, reference numeral 714 is a signal line for providing instructions, in accordance with the operation mode selection, for switching the image quality adjustment level and image processing method. Also, reference numeral 875 is a signal line for providing instructions indicating a time divisional image sequence for the image display unit that is suitable for the selected operation mode.

Here, the operation mode selection is pegged to switches or changes in an input stream between a personal computer (PC)-type image display and a television-type image display such as DVD or digital video, for example. However, additional cases can be imagined. When switches or changes in a transmission stream occur, or when the display channel is switched, a mode may be selected based on changes or switches in the decoding method. Also, a user may select the image qualities, switching between a brightness-emphasized mode and a color-emphasized mode, for example.

In this way, a construction is adopted for performing the following on the image inputted to the signal processing unit: format conversion for converting to a format corresponding to the selected operation mode; image quality adjustment; and PWM conversion. Additionally, this construction is for selecting a color filter plate 31, 32 that is suitable for the operation mode, and creating the irradiation light for irradiation on the spatial modulation element. As a result, the optical characteristics of the irradiated light, which restricted the display characteristics in the conventional image display device, are switched by means of the operation mode and thus may be optimized.

Next, explanation is made of an image display method using the image display device 1 described above.

In the present embodiment, the two color filter plates 31, 32 are selectively driven in accordance with the operation mode described above. For example, one color filter plate 31 is stopped while only the other color filter 32 is rotationally driven. Note, however, the one color filter 31 is stopped in such a position that the white area 31W fits with the optical path (i.e., overlap portion A). Note also, that such a control is performed at the signal switching unit 6, by switching the control signal for driving the color plates 31, 32 and switching the output of the position detection signal thereof.

In this state described just above, when the white light is radiated out from the lamp 30, this white light is sequentially converted to different colors as the color plate 32 is rotationally driven, and then is irradiated onto the image display element 2.

At the image display element 2, on the other hand, the image signal inputted from the image signal input unit 7 is converted into the time division signal at the signal processing unit 8, and based on the drive signal the image display element 2 reflects a spatial-modulated light that has undergone binary pulse width modulation. This spatial-modulated light (i.e., the reflected light) transits through a projection optical system 5, then is projected onto the screen 4 and is seen and recognized on the screen as the full color image.

Figure 4:
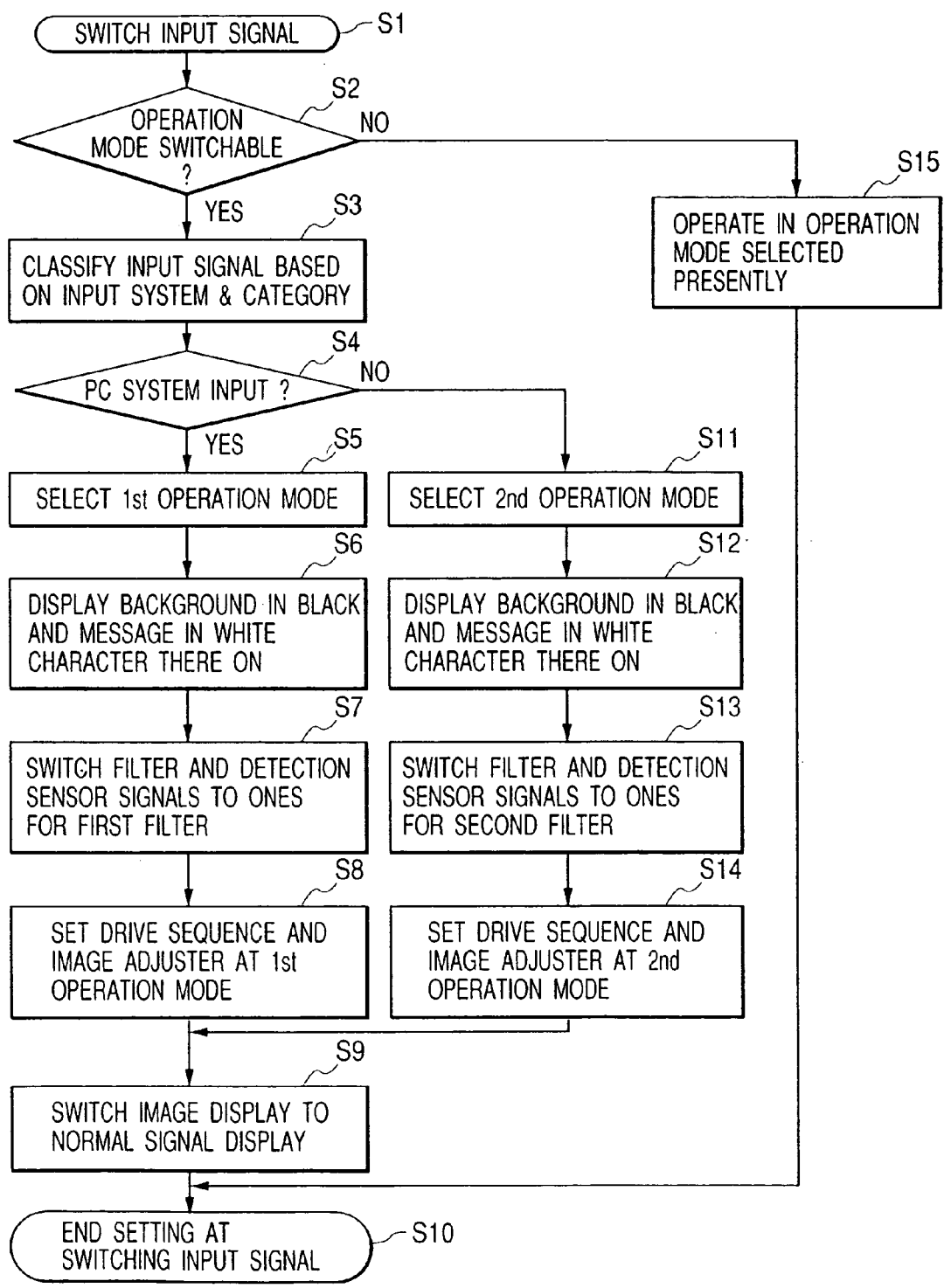
FIG. 4 is a flow chart diagram showing an operational flow at a time of switching an input signal.

More detailed explanation is made of this point with reference to FIG. 4. FIG. 4 is a flow chart diagram showing an operation flow at the time of the switching of the input signal, in accordance with the present embodiment.

S1 indicates an instance in which, for example, the input stream is switched or changed by means of the user input means, for example, or a signal from a different signal source inputted via an IEEE 1394 or other such communications line is switched or changed. In this situation, first, confirmation is made at S2 as to whether the operation mode selection is switchable together with the input change, or whether the operation mode is a fixed operation mode. In the case when the operation mode is switchable, classification of the input signal is performed by the microcomputer unit at S3 based on the input stream and attributes of the signal. At S4, determination is made as to whether the input is a PC system input or a television system input.

In the case of PC system input, the first operation mode is selected at S5.

Switching the operation of a color filter produces a result that the two color filters overlap each other in an unsynchronized fashion during the period of the switching. Therefore, at S6 the screen is set to display a background in black and an error message or the like in white letters thereon.

Next, at S7 the filter and the detection sensor signals are switched to ones for the first color filter plate 31.

Further, at S8 the image adjuster and other such signal processing and the time divisional drive sequence are switched so as to be at the first operation mode.

Once the switching has been completed, a second operation mode is selected at S11.

After that, at S12 the screen is set to display a background in black and an error message or the like in white characters thereon.

Next, at S13 the control signals for the color filter drive motor and the detection sensor signals are switched to ones for second filter 32 (At S10, the setting that is conducted at the time of the switching of the input signal is ended).

Additionally, at S14 the time divisional drive sequence and signal processing such as the image adjuster are set at the second operation mode.

When the switching has ended, the image display is switched to a normal signal display at S9, and the setting conducted at the time of the switching of the input signal is ended.

Further, when the operation mode is determined to be of a fixed setting at S2, a determination is made at S15 to operate in the operation mode that is selected presently, and the setting conducted at the time of the switching of the input signal is ended at S10. Of course, even in this case when the operation mode is of a fixed setting, a separate flow it is necessary to perform settings that are not related to the selection of the rotating filters (e.g., format conversion for resolution levels that match the input signal, or the like.) However, this is not the essence of the explanation of the present embodiment, so comments are omitted here.

In this way, even with aspects of image qualities such as brightness and color characteristics, which are in a trade off relationship, there are quite a few situations in which it is desirable to emphasize just one of the characteristics, such as brightness in the case of a PC display, or color characteristics in the case of a television display. The present invention may provide the user with an image display device having improved image quality, without making big alterations to the circuitry, by making a significant factor (namely the color filter plates 31, 32) for determining image qualities selectable.

The present embodiment shows an example in which one of the two color filter plates 31, 32 was selected and driven. However, by driving both of the color filter plates 31, 32 in a synchronized fashion, a composite illumination light may be obtained by transmitting through the two color filter plates 31, 32. Further, by switching between driving only one of the color filter plates 31, 32 and driving both at simultaneously, an image display having optical characteristics optimized for a variety of operation modes becomes possible.

Further, in the present embodiment the separate filter drive units 33, 34 are provided to the two color filter plates 31, 32. However, in the case when the color filter plates 31, 32 are arranged so as to overlap at least in part, it is also possible to realize the present invention using a construction having one drive motor, wherein a means for attaching and removing the filter plates to and from the rotation axis is used to drive only the filter plate that is on this axis.

Additionally, the present embodiment shows an example in which a color filter plate is switched in accordance with switches or changes in the input signal. However, the operation mode and the color filter plates 31, 32 could also be switched in accordance with switches or changes in the content of attributes of the input signal, or based on relative ratios of or the presence or absence of moving images to still images, or the use or purpose of the inputted image. Even such cases as these are examples of effective applications of the present invention.

Further, the present invention is not limited to controls by means of the user switching means. The present invention is also effective for a case when a detection means is provided inside the display device and performs discrimination automatically, with controls being performed by an interior microcomputer unit; or a case when controls are received via a communication from the exterior; or the like.

Japanese Patent Application Laid-open No. 6-230737 in the Official Gazette is an example of an art for switching a color filter portion of a display device. However, the object there is to switch between a black-and-white display and a color display, which is different from the present invention. Further, the filter is not presumed to be a rotating filter. The present invention discloses a specific and effective switching method for the case when switching is performed on color filter plates having combinations of colors having different characteristics, without needing to change the optical path of the irradiated light or switch filters in large-scale machinery.

Further, Japanese Patent Application Laid-open No. 09-061244 in the Official Gazette shows a method for switching a filter being placed in front of an image pickup device inside a color sorting device for using color to classify, determine or identify object. According to the invention therein, a plurality of filters are each combined and used to achieve many wavelength characteristics. However, an objective of the present invention is to switch the display characteristics of the image display device. Further, the present invention shows a specific method for switching rotating filters changing in a chronologically continuous fashion, particularly based on a color-sequential display format. Thus, the objectives and methods of use of the present invention are significantly different.

Embodiment 2

In Embodiment 1 described above, particular attention was given to the trade off relationship obtaining between brightness and color characteristics from among the characteristics of the filter plates 31, 32. However, the present invention is effective for various other characteristics of color filters that are in trade off relationships.

Figure 11:
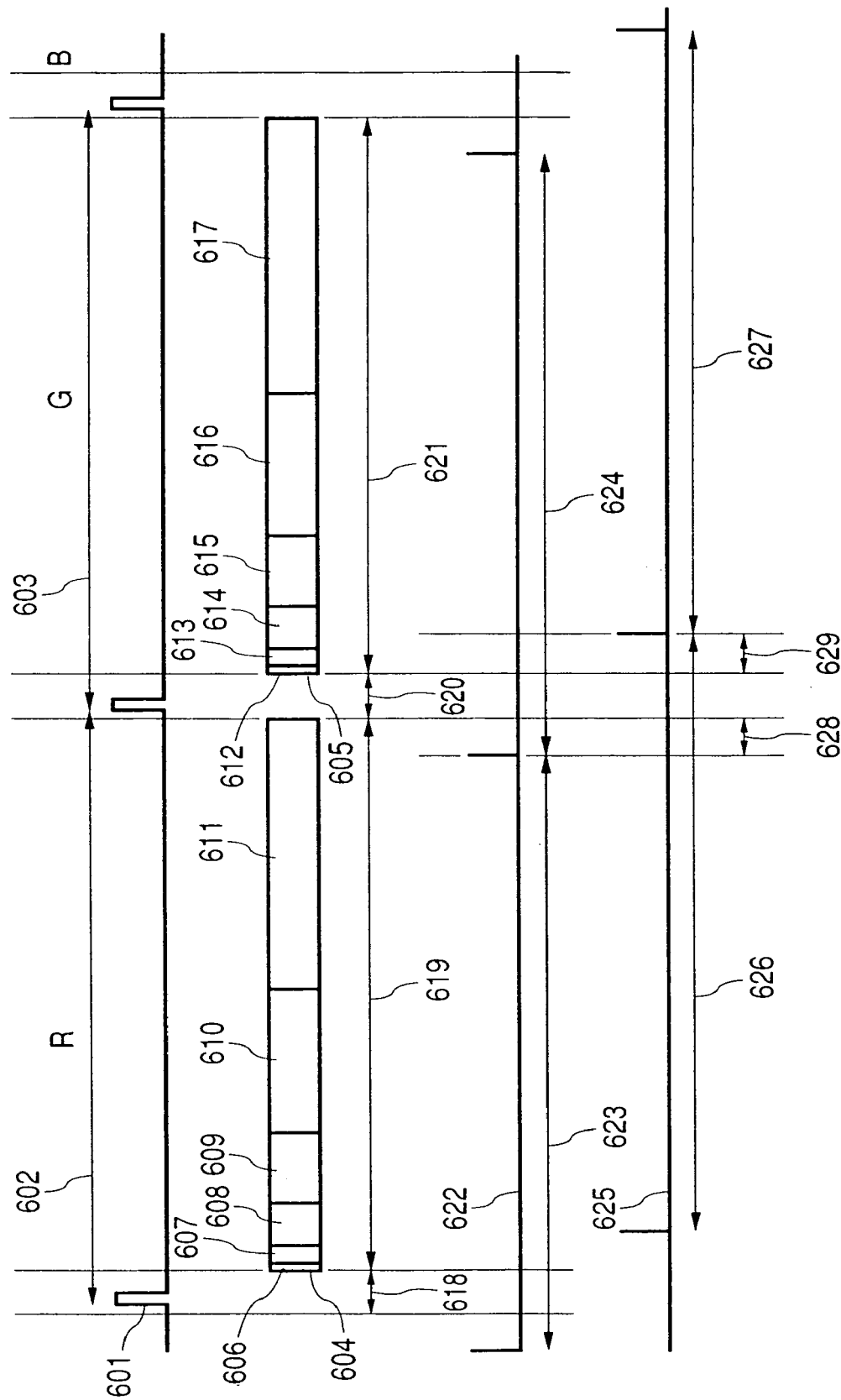
FIG. 11 is a diagram for explaining operations of the conventional image display device.
Figure 12:
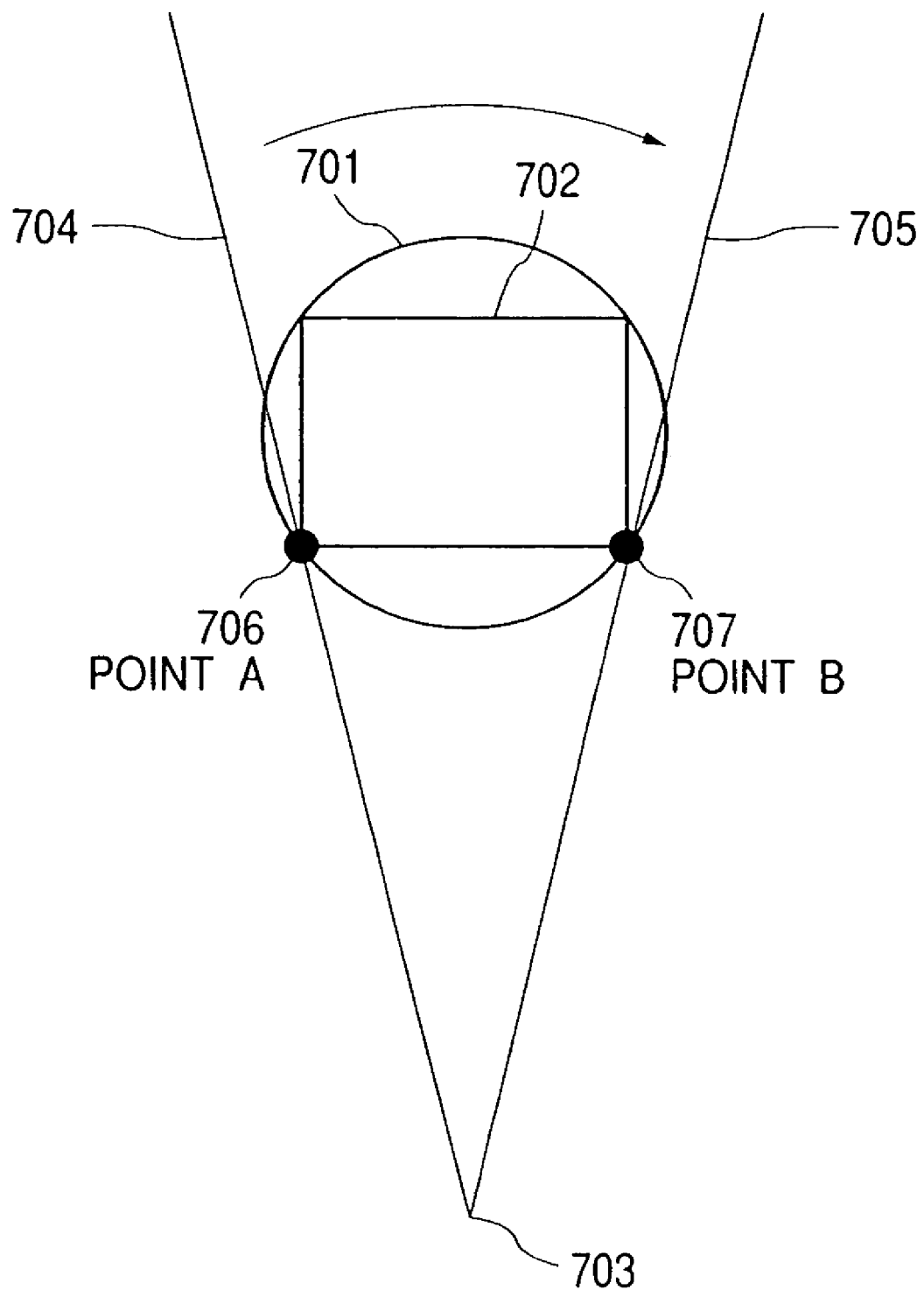
FIG. 12 is a diagram for showing operations of the conventional image display device.
Figure 13:
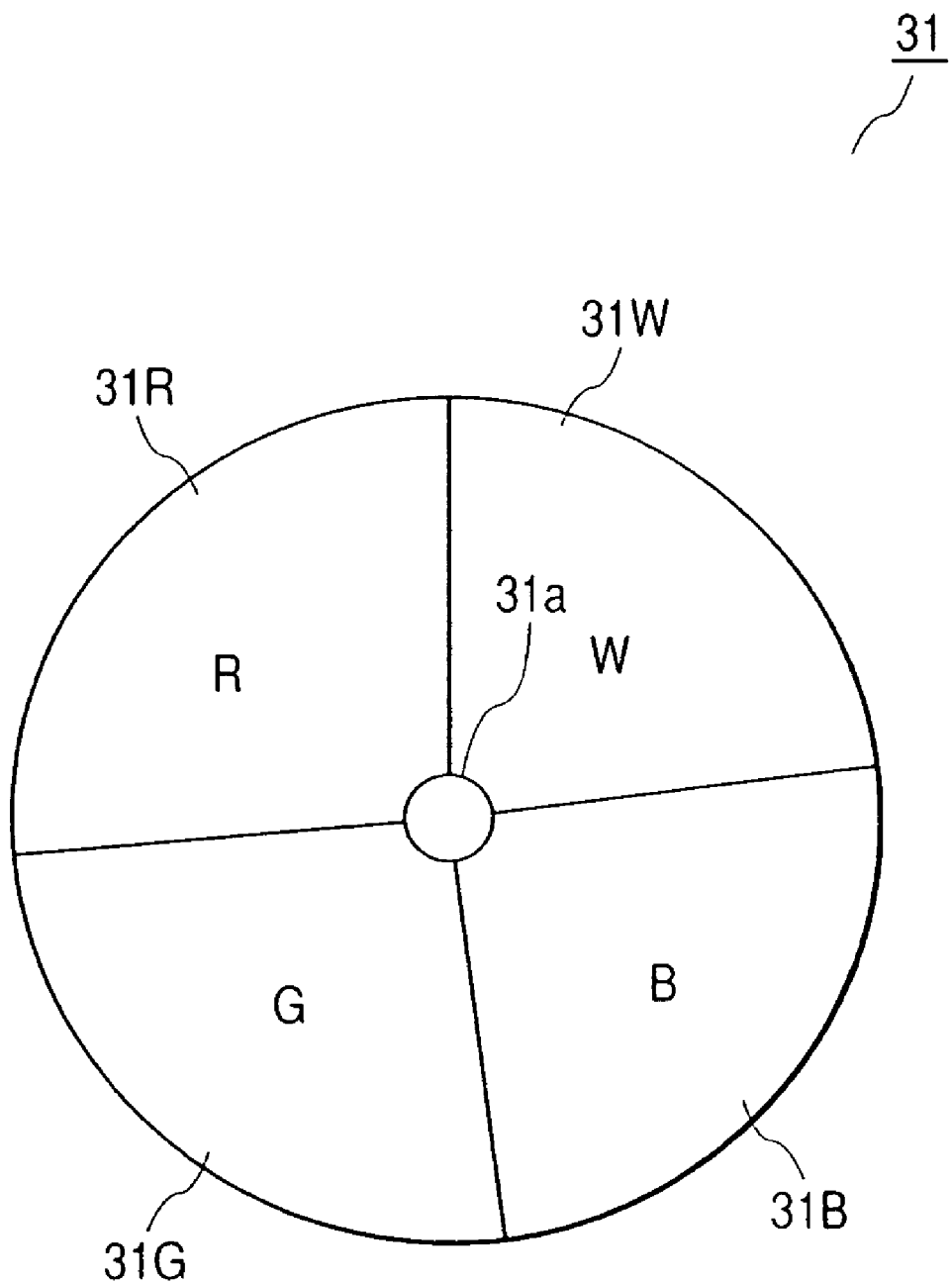
FIG. 13 is a diagram for explaining the form and other aspects of the color filter plate.
Figure 14:
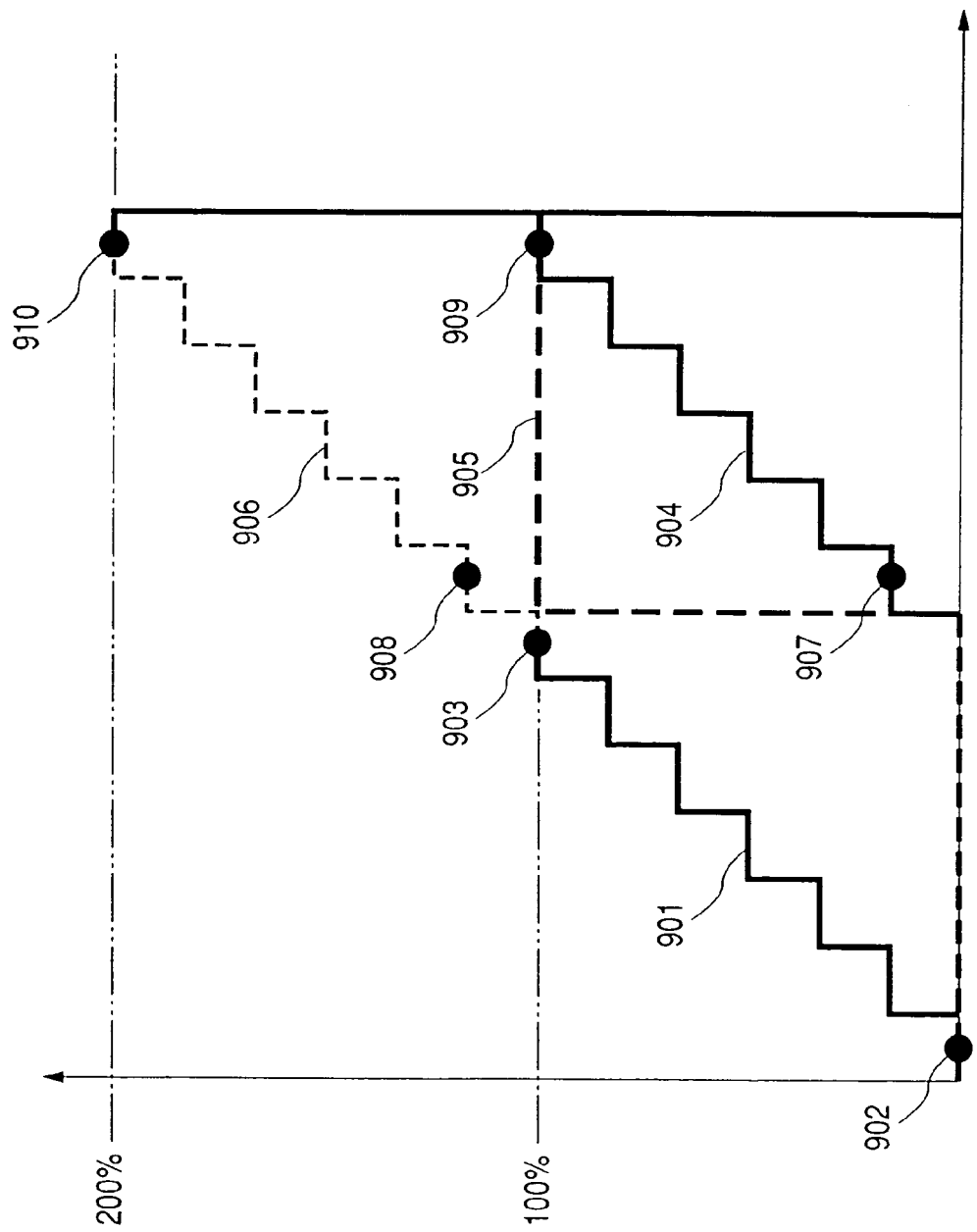
FIG. 14 is a diagram for explaining a white-brightness-emphasization processing.
Figure 15:
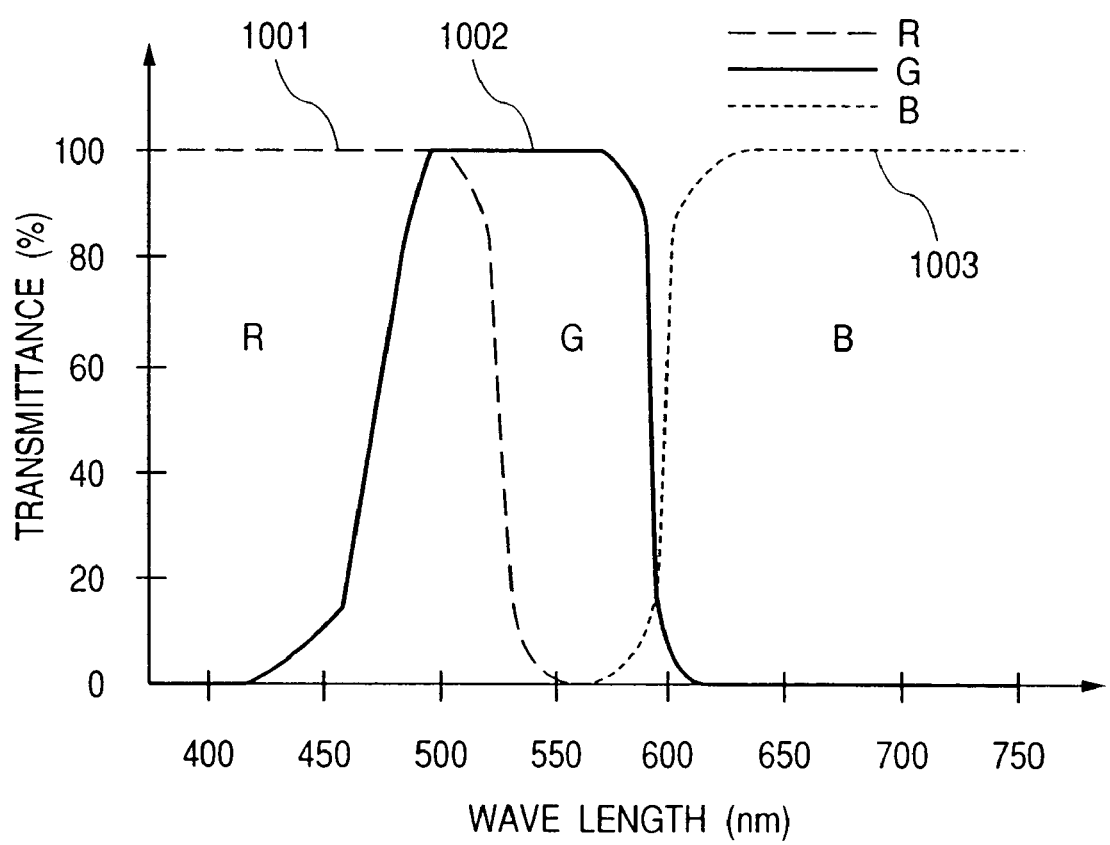
FIG. 15 is a diagram for explaining a transmittance wavelength region of the color filter.
Figure 4:
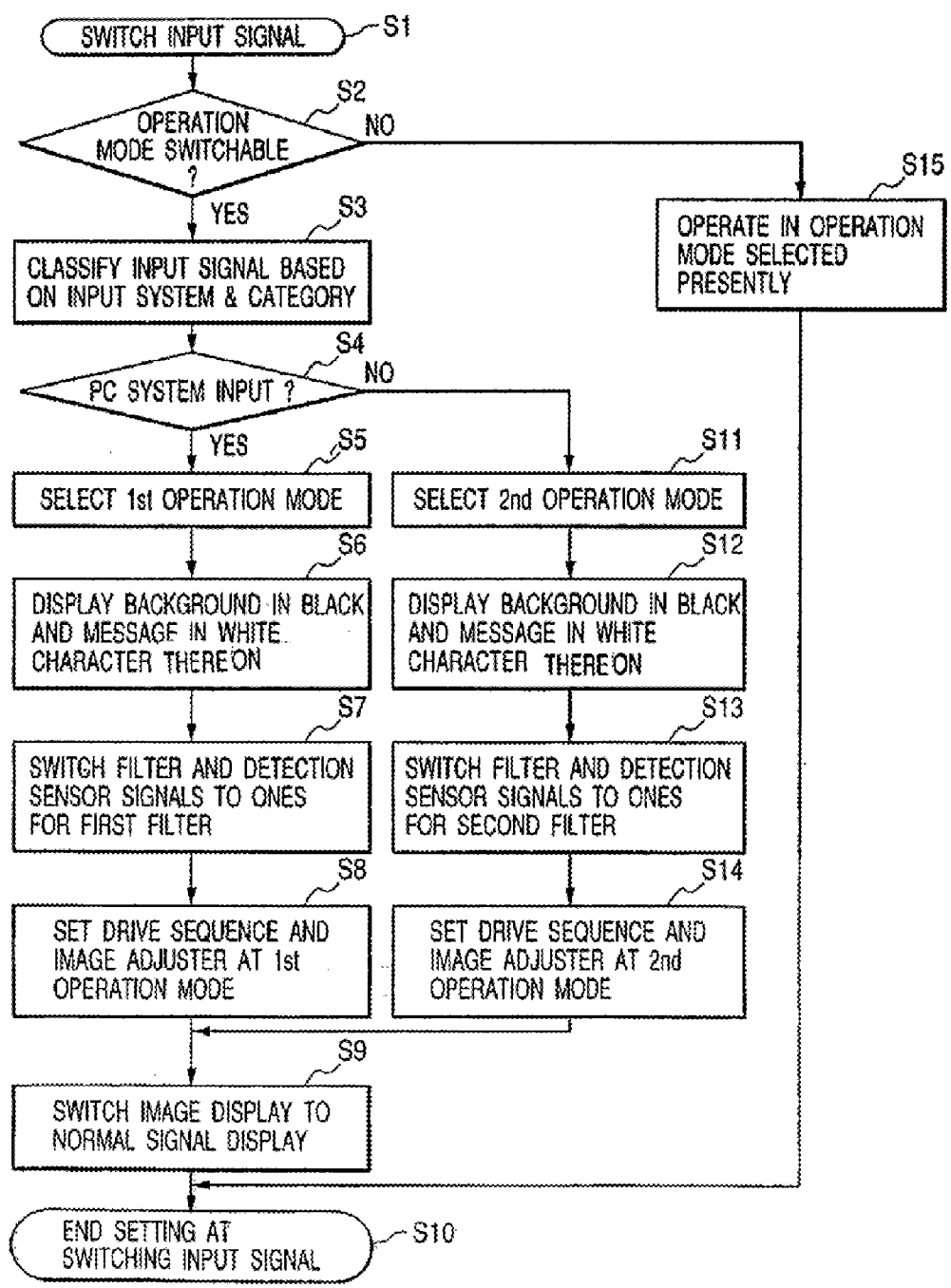
Figure 7:
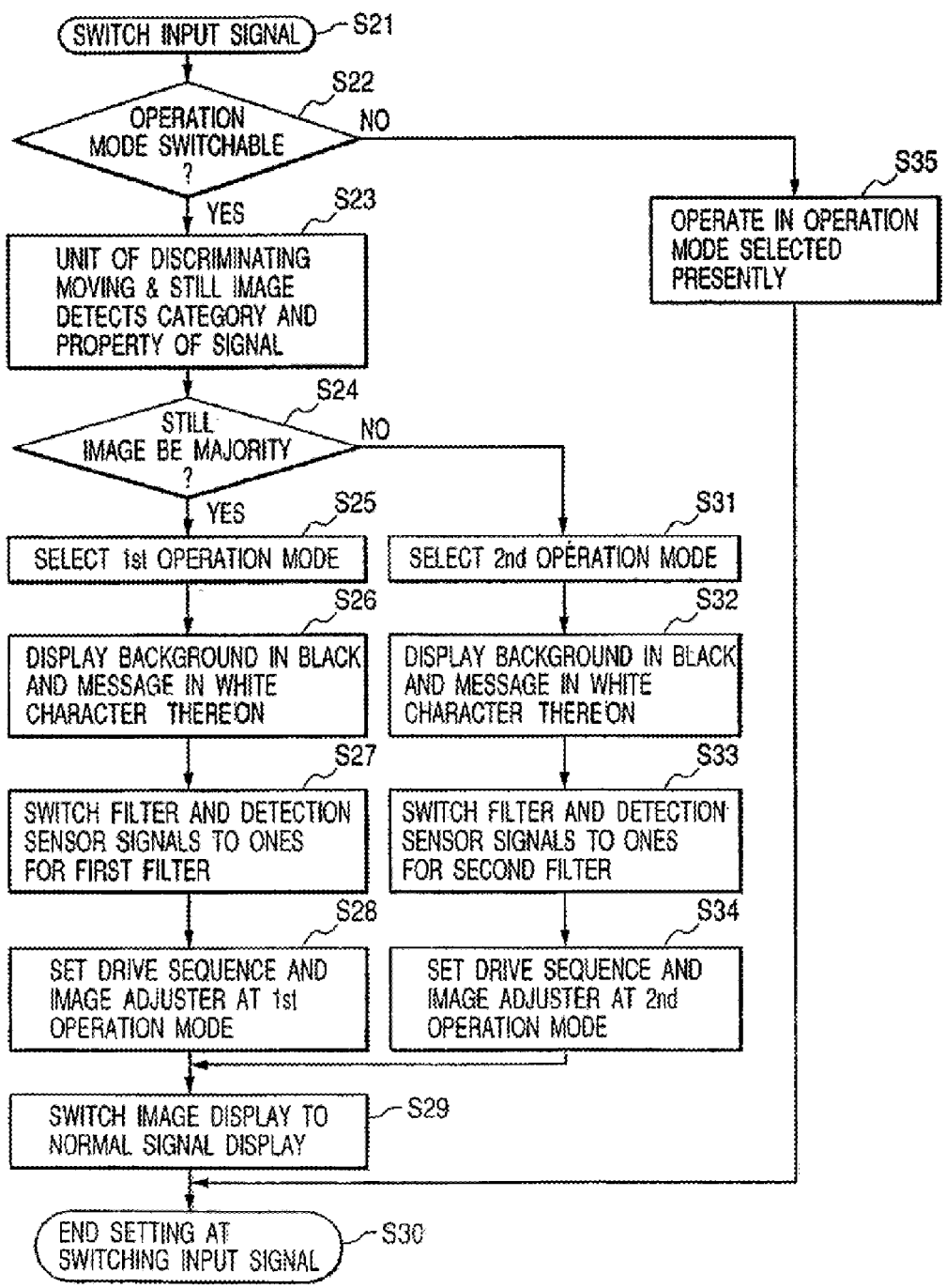

As explained using FIG. 11 and FIG. 12 in the discussion of the conventional art, there exists a period at the color segment border regions which cannot be used as a display period due to the occurrence of color mixing. This non-display period grows as the number of divisions increase, and leads to diminished brightness.

On the other hand, as discussed above, as a remedy for dealing with the color splitting phenomenon it is effective to increase the number of rotations and increase the number of divisions in order to increase the frequency of color switches. However, there are limitations placed on the possible number of rotations by such factors as heat and sound from the rotation motor, cost, etc. Therefore, constructions in which the number of divisions is increased are often used particularly in display devices that place particular importance on motion picture characteristics.

Figure 5:
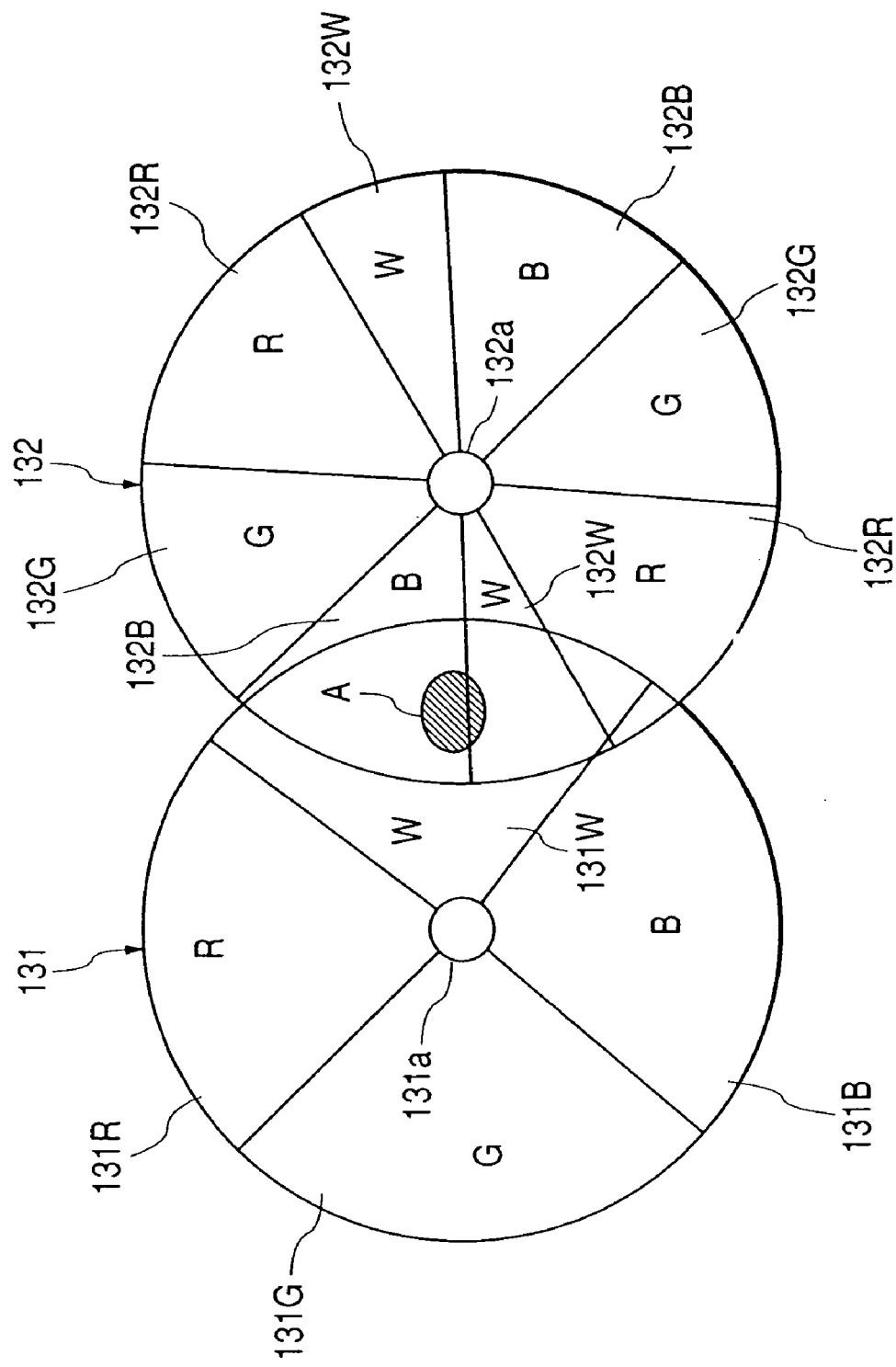
FIG. 5 is a diagram showing another example of a configuration or the like of the color filter plate.
Figure 6:
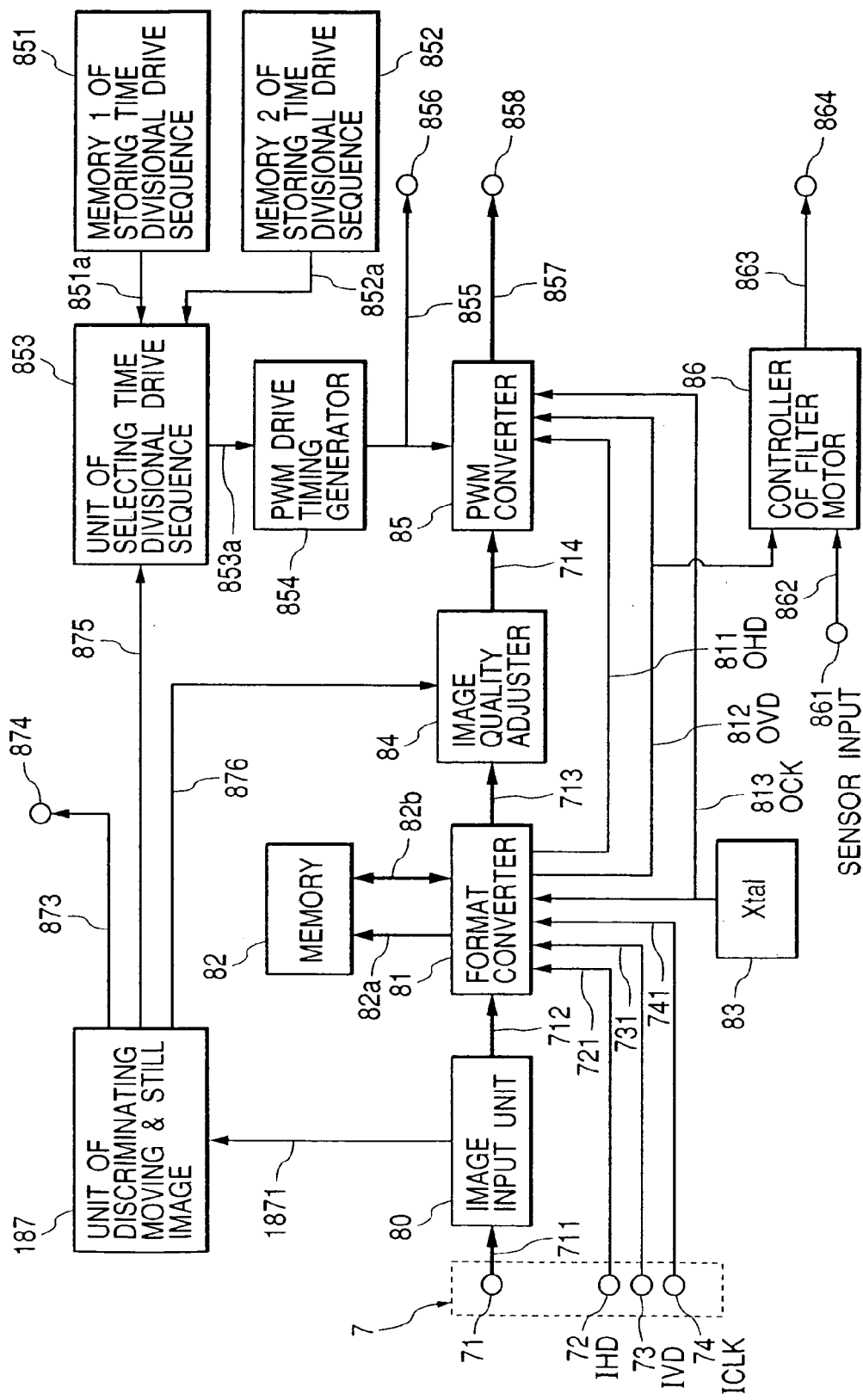
FIG. 6 is a block diagram showing a detailed construction of the signal processing unit.

The color filter members used in the present embodiment are, as shown in FIG. 5, two round color filter plates 131, 132 similar to Embodiment 1. The color filter plates 131, 132 overlap each other in part, and this part is arranged so that the light from the lamp 30 is injected to this overlapping portion A at a right angle.

Note that, one color filter plate 131 has the same form as color filter plate 31 (i.e., being divided into four color areas of red, green, blue and white: 131R, 131G, 131B and 131W; and the respective relative portions occupied thereby are 1:1:1:1, each being 90 degrees). On the other hand, color filter plate 132 is divided into eight color areas of red, green, blue, white, red, green blue and white: 132R, 132G, 132B, 132W, 132R, 132G, 132B and 132W. In other words, in the present embodiment, the numbers of divisions of color areas in the color filter plates 131, 132 are made to be different from each other. Meanwhile, the color filter 131 is constructed so as to run one sequence of RGB during the period of one rotation, with little loss in quantity of light. Further, there is more than sufficient time; therefore, this is a mode wherein gradations and operation speed may be sufficiently achieved for prioritizing image quality. This is a setting that is suitable for displays of paintings and scenery and such still picture images being highly tonal and having broad dynamic ranges. In contrast, the other color filter plate 132 is constructed so as to run the sequence of RGB two times during the period of one rotation and has many divisions. There is a loss in the light quantity in between the segments and there is no excess of time in the sub-fields. Therefore, this is a mode for prioritizing motion picture characteristics more than quantity of gradations and operation speed. This setting is suitable for primarily moving pictures, being movies or other such motion images with which it is desirable to avoid the color splitting (color breakdown) phenomenon.

Further, the two color filter plates 131, 132 are each provided with a white area 131W, 132W respectively. In the case when only the color filter plate 132 is rotationally driven, the other color filter plate 131 is stopped in a state so that the white area 131W aligns with the optical path A, as shown in FIG. 5. On the other hand, in the case when only the color filter plate 131 is rotationally driven, the other color filter plate 132 is stopped in a state so that the white area 132W aligns with the optical path A. There are many trade off relationships obtaining between the characteristics of the irradiated light created by the color filter plates 131, 132 and limitations from the construction of the color filters such that one may be improved only by sacrificing another. However, despite this, the workings described above produce the result that it becomes possible to select from irradiated light having two types of optical characteristics, and it becomes possible to realize a display having characteristics being optimal for the each input image from the PC system, television system, etc.

Note that, another construction of the image display device is almost the same as that of Embodiment 1; however, the signal processing unit has a unit of discriminating moving and still images 187 arranged therein, rather than having the unit of selecting operating mode 87.

This unit of discriminating moving and still images 187 is a unit of discriminating moving and still images for discriminating relative ratios and the presence or absence of moving images and still images in the image signal inputted to the image input unit 80. Based on the result of this discrimination, the operations of the image adjuster and the time divisional drive sequence are switched, and also, selection and control of the plurality of rotating filters is performed. Reference numeral 1871 is a signal line for transmitting a discrimination signal from the image input unit 80. Reference numeral 873 is a signal line for the color filter plate selection signal, and reference numeral 874 is the input terminal thereof.

This unit of discriminating moving and still image 187 has functions being included, for example, in the microcomputer unit not shown in the diagram. Reference numerals 875, 876 are signal lines of the selection signal running from the unit of discriminating moving and still image 187 to each unit. Reference numeral 876 is a signal line for providing instructions to switch the degree of adjustment performed by the image adjuster and the method of image processing. Further, reference numeral 875 is a signal line for providing instructions as to a time divisional drive sequence for the image display portion that is suited to the discriminated attributes of the image. Here, the discriminated attributes of the image refers to a discrimination as to whether the image is an image being in majority a still image such as in images of a PC or high definition digital camera, or in majority a moving image such as in images of a DVD or digital video, for example.

In this way, a construction is adopted for performing the following on the image inputted into the signal processing unit: format conversion to convert the format so as to correspond to the discriminated attributes of the image; image adjustment; PWM conversion; and also, selection of the color filter plate 131, 132 that is suitable for the discriminated attributes of the image, and then creation of the irradiation light. Conventionally, the optical characteristics of the irradiation light limited the display characteristics of the image display device. However, the arrangements described above enable the optical characteristics of the irradiation light to be switched and optimized based on the discriminated attributes of the image.

Figure 7:
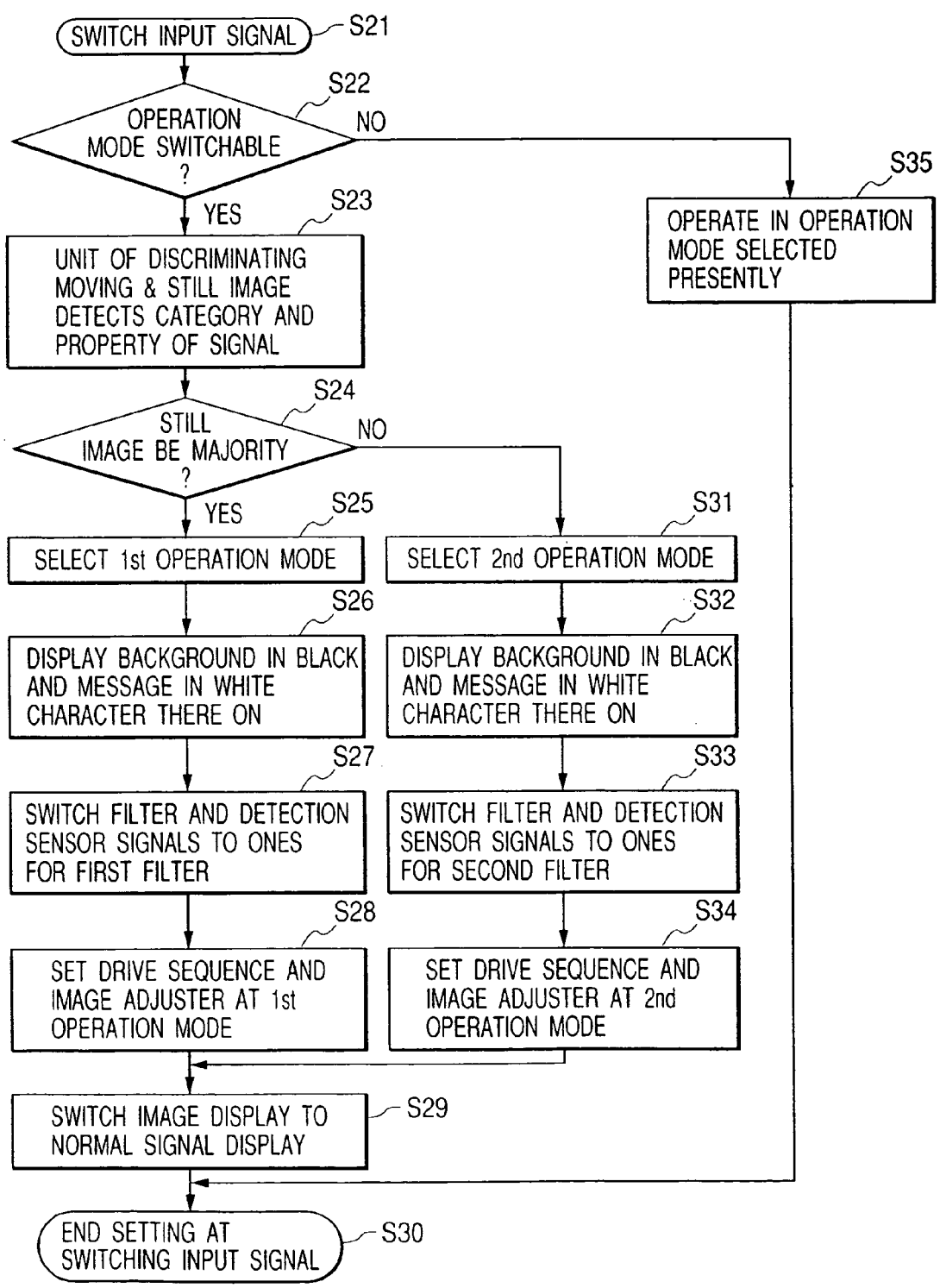
FIG. 7 is a flow chart showing an operational flow at the time of switching the input signal.

FIG. 7 shows an example of an operations flow at a time when an input signal is switched or changed, in accordance with the present embodiment.

S21 shows an instance in which an input stream is switched or changed by means of a user input means, for example, or a signal is switched to a signal from a different signal source inputted via an IEEE 1394 or other such communications stream, or another such event occurs. In this case, first at S22, verification is made as to whether the operation mode is switchable in response to changes in the input or not. In the case when the operation mode is switchable, the unit of discriminating moving and still images performs the discrimination between a moving image and a still image at S23, and at S24 the judgment is made as to whether still images or moving images are the majority in the image.

In the case when the image is judged to be in majority a still image, a first operation mode is selected at S25.

Switching the operation of the rotating filter makes the two rotating filters overlap each other in an unsynchronized fashion during the period of the switching. Therefore, at S26 a setting is made so that a background is displayed in black and an error message or the like is displayed in white characters thereon.

Next, at S27 the control signal for the drive motor of the rotating filter and the sensor for detecting the position of the filter are switched to ones for the first color filter plate 131.

Additionally, at S28 the drive sequence and image adjuster are set at the first operation mode.

When the switching has finished, at S29 the image display is switched to the normal signal display, and at S30 the setting conducted at the time of switching the input signal is ended.

In the case when the image is determined to be in majority a moving image at S24, the second operation mode is selected at S31.

After that, at S32 the background is displayed in black and the message in white characters is displayed thereon at S32.

Next, at S33 the control signal for the drive motor of the rotating filter and the sensor for detecting the position of the filter are switched to ones for the second filter 132.

Additionally, at S34 the drive sequence and image adjuster are set at the second operation mode. When the switching is finished, at S29 the image display is switched to the normal signal display, and at S30 the setting performed at the time of switching the input signal is ended.

Further, in the case when the operation mode is unswitchable at S22, a determination is made at S35 to operate in the operation mode that is selected presently, and the setting performed at the time of switching the input signal is ended at S30.

In this way, even when brightness and motion characteristics or other such image qualities are in a trade off relationship in the color filter plates, when the image is in majority a still image, the rotating filter having few color segment divisions is selected for color brightness. On the other hand, when the image is in majority a moving image, the rotating filter having many color segment divisions is selected for motion characteristics and for avoiding such problems as the color splitting phenomenon. As a result, the image display device for optimizing image qualities in accordance with use and purpose may be realized inexpensively, without preparing large-scale circuitry or mechanical construction.

Having taken particular notice of the trade off relationship between mutually conflicting brightness and motion characteristics, the plurality of color filter plates 131, 132 are switched and driven to create illumination light that is suitable for a still image mode and a moving image mode respectively.

As explained above, according to the present invention, each of the plural color filter members sequentially converts the white light irradiated from the light source into each color, but the characteristics of the two color filter members are set so as to be mutually different. Therefore, the rotationally driven color filter members are switched in accordance with the display mode, display objective, use, or attributes of the input signal for example, as appropriately needed. This produces the result that the image qualities of a full color image may be switched. In other words, brightness, color characteristics and the number of divisions to the filter for example, were conventionally in trade off relationships, and the construction of the color filter and the characteristics of the display were both limited so there was only one construction and one set of characteristics. However, a plurality of constructions and sets of characteristics are made available and switchable. Thus, (without otherwise improving the electrical performance such as operation speed, or improving the large-scale mechanical structure or improving focusing efficiency or other aspects of the performance of the optical system, for example) it becomes possible to change the preferred display characteristics in accordance with the image and perform the most suitable display. Thus, a high performance display for realizing a display that is flexibly optimized to diversified input images is possible.

What is claimed is:

1. An image display device comprising:
   an image display element for modulating incident light;
   a light source for emitting white light;
   a plurality of color filters, each of which has a plurality of regions corresponding to different colors;
   a selecting unit for selecting a color filter from said plurality of color filters, wherein light of plurality of colors obtained by the selected color filter are successively irradiated to the image display element; and
   a projection optical system for projecting the light modulated by said image display element,
   wherein one of the color filters has a region corresponding to a predetermined color at a first predetermined ratio and another of the color filters has a region corresponding to the predetermined color at a predetermined ratio different from the first ratio.

2. An image display device according to claim 1, wherein characteristics of said color filters are different from each other.

3. An image display device according to claim 1, wherein the selecting of the color filter is conducted in response to changes in an input signal attribute.

4. An image display device according to claim 1, wherein the selecting of the color filter is conducted in response to a control from user input means.

5. An image display device according to claim 1, wherein the selecting of the color filter is conducted in response to a control via a communication from an external source.

6. An image display device according to claim 1, wherein the selecting of the color filter is conducted automatically.

7. An image display device according to claim 1, wherein said image display element is a liquid crystal element.

8. An image display device according to claim 1, wherein said image display element is an MEMS-type spatial modulation element.

9. An image display device according to claim 1, wherein said image display element is a spatial modulation display element having arrayed micro-mirrors.

10. An image display device according to claim 1, wherein the projection optical system comprises a lens.

11. An image display device according to claim 1, wherein the light of the plurality of colors obtained by the selected color filter are successively irradiated to the image display element via a predetermined region of another of the color filters.

* * * * *

UNITED STATES PATENT AND TRADEMARK OFFICE
CERTIFICATE OF CORRECTION

PATENT NO.       : 6,995,817 B2
APPLICATION NO.  : 10/940744
DATED            : February 7, 2006
INVENTOR(S)      : Kazuyuki Shigeta It is certified that error appears in the above-identified patent and that said Letters Patent is hereby corrected as shown below:

[56]  REFERENCES CITED:

U.S. PATENT DOCUMENTS, "Pettitt" should read --Pettit--.
FOREIGN PATENT DOCUMENTS, "JP   2000/98325   4/2000" should be deleted.

[57]  ABSTRACT:

Line 4, "and" should be deleted.

SHEET 4:    (see attached)

FIG. 4, "THERE ON" (both occurrences) should read --THEREON--.

SHEET 7:    (see attached)

FIG. 7, "THERE ON" (both occurrences) should read --THEREON--.

COLUMN 7:

Line 63, "coloer" should read --color--.

Signed and Sealed this

Twenty-first Day of November, 2006

JON W. DUDAS
*Director of the United States Patent and Trademark Office*